US011901665B2

(12) United States Patent
Takizawa

(10) Patent No.: US 11,901,665 B2
(45) Date of Patent: Feb. 13, 2024

(54) CONNECTOR INCLUDING EXTERNAL HOUSING AND PLURAL INTERNAL HOUSINGS

(71) Applicant: Japan Aviation Electronics Industry, Ltd., Tokyo (JP)

(72) Inventor: Satoru Takizawa, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 210 days.

(21) Appl. No.: 17/502,510

(22) Filed: Oct. 15, 2021

(65) Prior Publication Data

US 2022/0216641 A1 Jul. 7, 2022

(30) Foreign Application Priority Data

Jan. 7, 2021 (JP) ................................ 2021-001241

(51) Int. Cl.
*H01R 13/518* (2006.01)
*H01R 13/502* (2006.01)

(52) U.S. Cl.
CPC ......... *H01R 13/518* (2013.01); *H01R 13/502* (2013.01)

(58) Field of Classification Search
CPC ................ H01R 13/518; H01R 13/502; H01R 13/4361; H01R 13/629; H01R 13/639
See application file for complete search history.

(56) References Cited

U.S. PATENT DOCUMENTS 4,997,386 A * 3/1991 Kawachi ............ H01R 13/6272 439/352
9,011,173 B2 * 4/2015 Osada .................. H01R 13/518 439/527
11,482,809 B2 * 10/2022 Zebhauser ........... H01R 13/516
2003/0148651 A1 * 8/2003 Shuman ............. H01R 13/6272 439/358

(Continued)

FOREIGN PATENT DOCUMENTS

EP 0731530 A2 9/1996
EP 2854229 A1 4/2015
JP 2016-511520 A 4/2016

OTHER PUBLICATIONS

European Search Report dated Apr. 8, 2022 in corresponding European Application No. 21205102.3.

(Continued)

*Primary Examiner* — Abdullah A Riyami
*Assistant Examiner* — Nader J Alhawamdeh
(74) *Attorney, Agent, or Firm* — Renner, Otto, Boisselle & Sklar, LLP

(57) ABSTRACT

A connector includes an external housing having cavities, internal housings, and terminals to be accommodated in the internal housings, wherein retainers extending in an insertion direction of internal housings into the cavities are formed on inner wall surfaces of the cavities, groove parts for receiving the retainers are formed on outer wall surfaces of the internal housings, the retainers are configured to achieve secondary locking of the plurality of terminals accommodated in the internal housings, the retainers of the cavities have different shapes from one another, and the groove parts of the internal housings have shapes complementary to the shapes of the retainers of the corresponding cavities.

6 Claims, 41 Drawing Sheets

(56) References Cited

U.S. PATENT DOCUMENTS

| | | | | |
|---|---|---|---|---|
| 2014/0273566 | A1 | 9/2014 | Allgood et al. | |
| 2015/0200483 | A1 | 7/2015 | Martin et al. | |
| 2022/0216641 | A1* | 7/2022 | Takizawa | H01R 13/502 |

OTHER PUBLICATIONS

European Office Action dated Apr. 22, 2022 in corresponding European Application No. 21205102.3.

Chinese Office Action dated Jul. 6, 2023 in corresponding Chinese Application No. 202111317513.1.

* cited by examiner

CONNECTOR INCLUDING EXTERNAL HOUSING AND PLURAL INTERNAL HOUSINGS

INCORPORATION BY REFERENCE

This application is based upon and claims the benefit of priority from Japanese patent application No. 2021-1241, filed on Jan. 7, 2021, the disclosure of which is incorporated herein in its entirety by reference.

BACKGROUND

The present disclosure relates to a connector.

Patent Literature 1 (Published Japanese Translation of PCT International Publication for patent application, No. 2016-511520) discloses an electrical connector assembly that includes a shield housing 101 having a plurality of receptacle carrier receiving cavities 100, and a plurality of receptacle carriers (not shown) to be respectively inserted into the plurality of receptacle carrier receiving cavities 100 as shown in FIG. 41 of the present application. The inner wall surface of each of the receptacle carrier receiving cavities 100 has a projecting part 102. When each of the receptacle carriers is inserted into each of the receptacle carrier receiving cavities 100 in this structure, a plurality of terminals accommodated in each of the receptacle carriers are secondarily locked by the projecting part 102.

SUMMARY

However, in the structure of Patent Literature 1 described above, when inserting each receptacle carrier into the corresponding receptacle carrier receiving cavity 100, it is necessary to pay close attention not to insert each receptacle carrier into another receptacle carrier receiving cavity 100 that is different from the corresponding receptacle carrier receiving cavity 100. In other words, the problem of wrong insertion that inserts each receptacle carrier into another receptacle carrier receiving cavity 100 that is not the corresponding receptacle carrier receiving cavity 100 has been occurring.

An object of the present disclosure is to provide a technique that prevents each internal housing from being inserted into a cavity different from a corresponding cavity when inserting a plurality of internal housings into a plurality of cavities formed in an external housing.

A connector according to an embodiment includes an external housing including a plurality of cavities and a plurality of internal housings to be respectively inserted into the plurality of cavities, each internal housing accommodating a plurality of terminals, wherein a retainer extending in a housing insertion direction of inserting each of the internal housings into each of the cavities is formed on an inner wall surface of each of the cavities, a groove part for receiving the retainer when each of the internal housings is inserted into each of the cavities is formed on an outer wall surface of each of the internal housings, when each of the internal housings is inserted into each of the cavities, the retainer is inserted into the groove part, and thereby the plurality of terminals accommodated in each of the internal housings are secondarily locked by the retainer, the retainers of the plurality of cavities have different shapes from one another, and the groove parts of the plurality of internal housings have shapes complementary to the shapes of the retainers of corresponding cavities.

This prevents each internal housing from being inserted into a cavity different from a corresponding cavity when inserting a plurality of internal housings into a plurality of cavities formed in an external housing.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
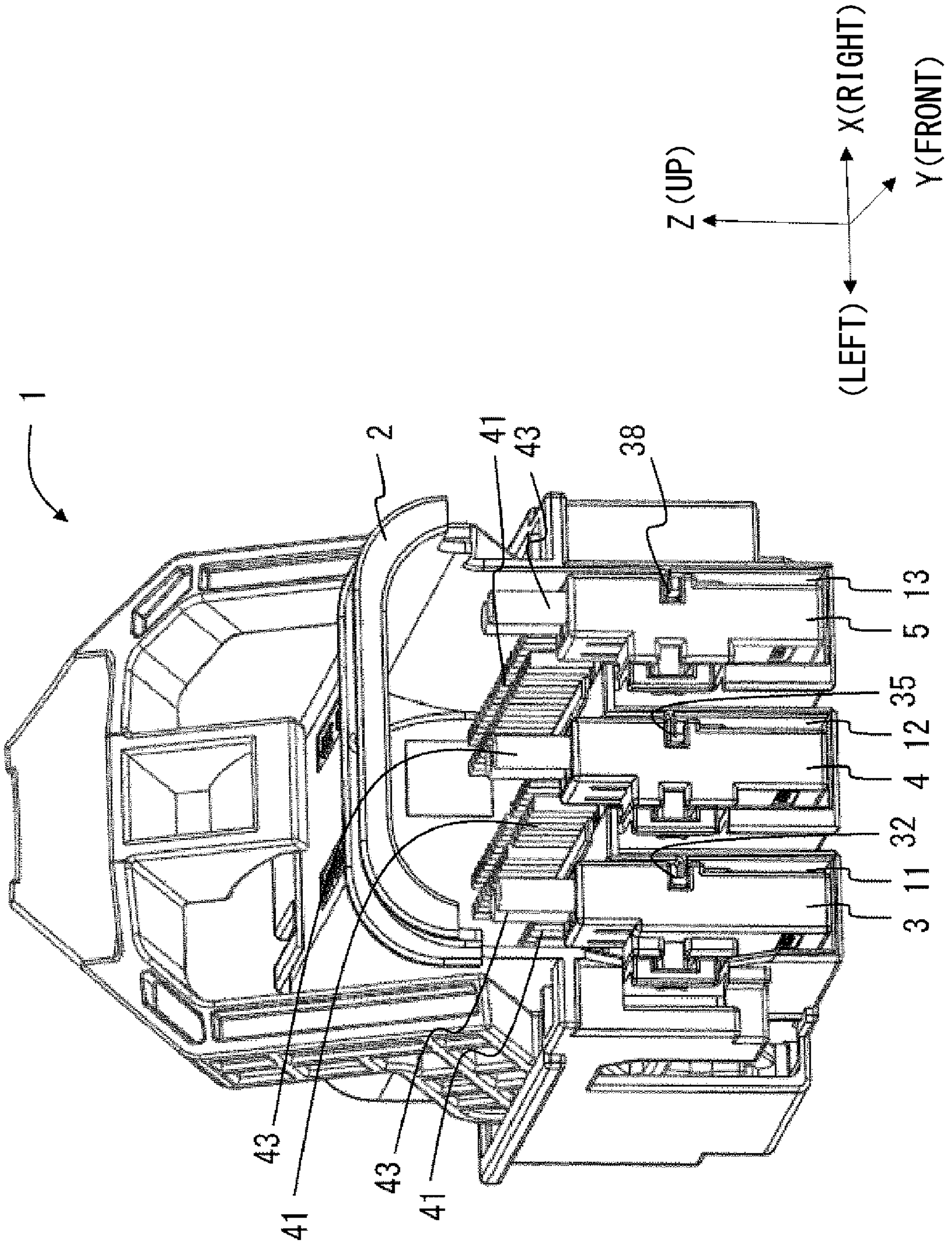
FIG. 1 is a perspective view of an external housing in which internal housings are accommodated.

An embodiment of the present disclosure will be described hereinafter with reference to the drawings. As shown in FIG. 1, a connector 1 includes an external housing 2 in which cavities 11, 12, and 13 are formed, and a plurality of internal housings 3, 4, and 5 to be accommodated in the external housing 2. As described later, the number of cavities formed in the external housing 2 is three.

The internal housings 3, 4, and 5 are accommodated in the cavities 11, 12, and 13, respectively. The internal housing 3 is accommodated in the cavity 11. The internal housing 4 is accommodated in the cavity 12. The internal housing 5 is accommodated in the cavity 13.

Thus, the cavity corresponding to the internal housing 3 is the cavity 11. The cavity corresponding to the internal housing 4 is the cavity 12. The cavity corresponding to the internal housing 5 is the cavity 13.

Figure 2:
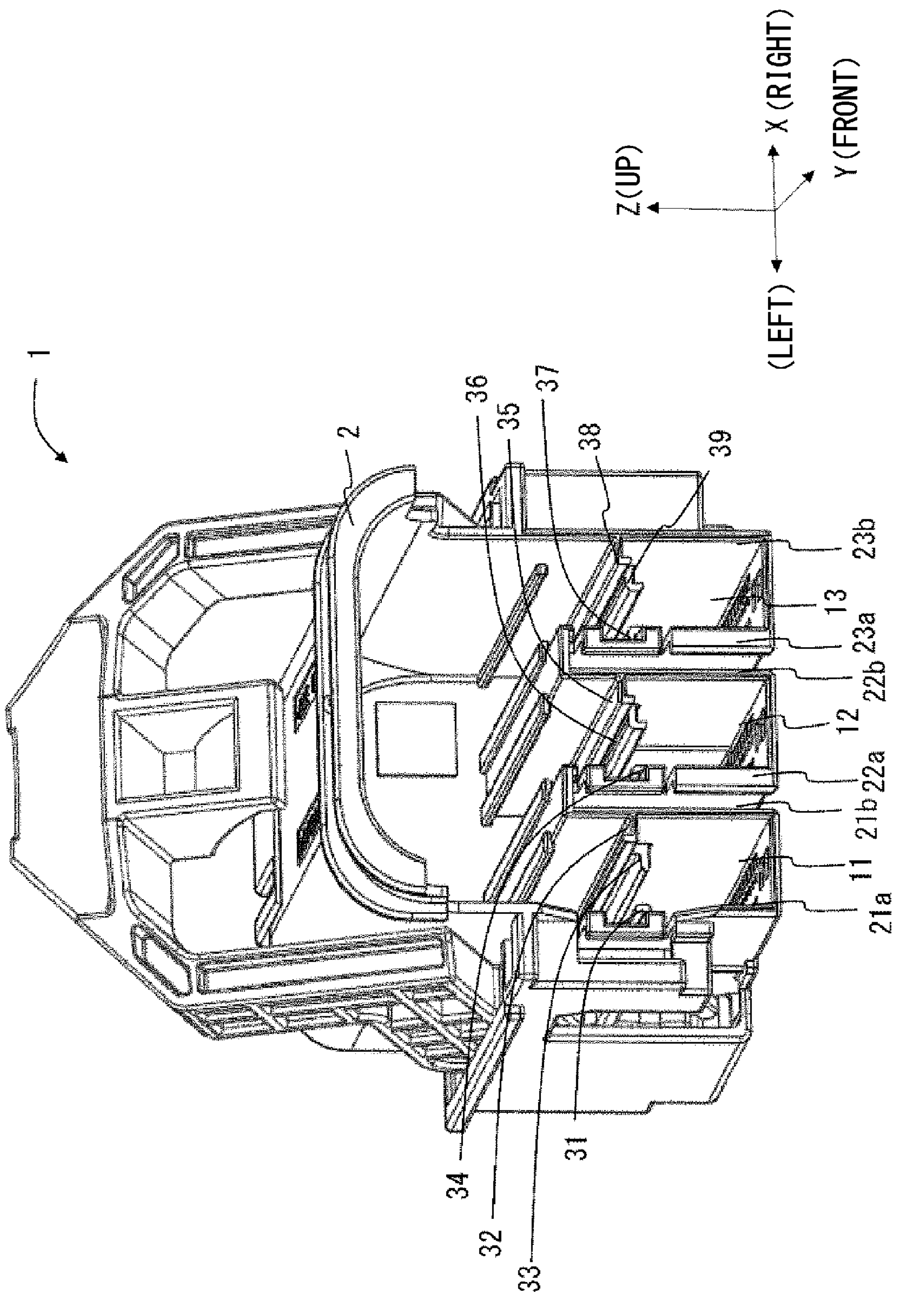
FIG. 2 is a perspective view of the external housing in which the internal housings are not accommodated.

FIG. 1 is a perspective view of the external housing 2 in the state where the internal housings 3, 4, and 5 are accommodated in the external housing 2, and FIG. 2 is a perspective view of the external housing 2 in the state where the internal housings 3, 4, and 5 are not accommodated in the external housing 2. Note that, in FIG. 1 and other figures, wires 41 and 43 are partly not shown for better visibility of the figures.

Figure 3:
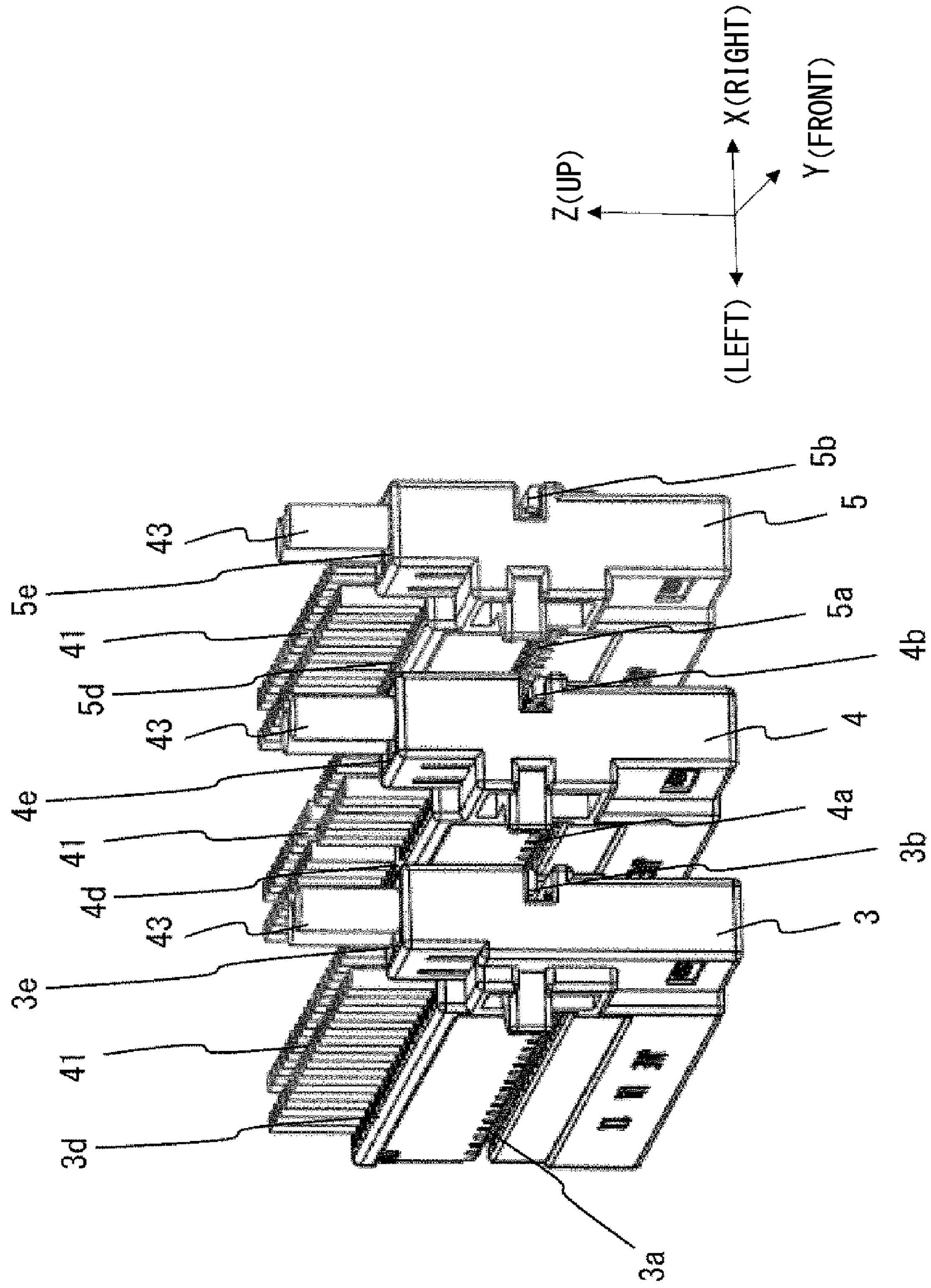
FIG. 3 is a perspective view of three internal housings.
Figure 4:
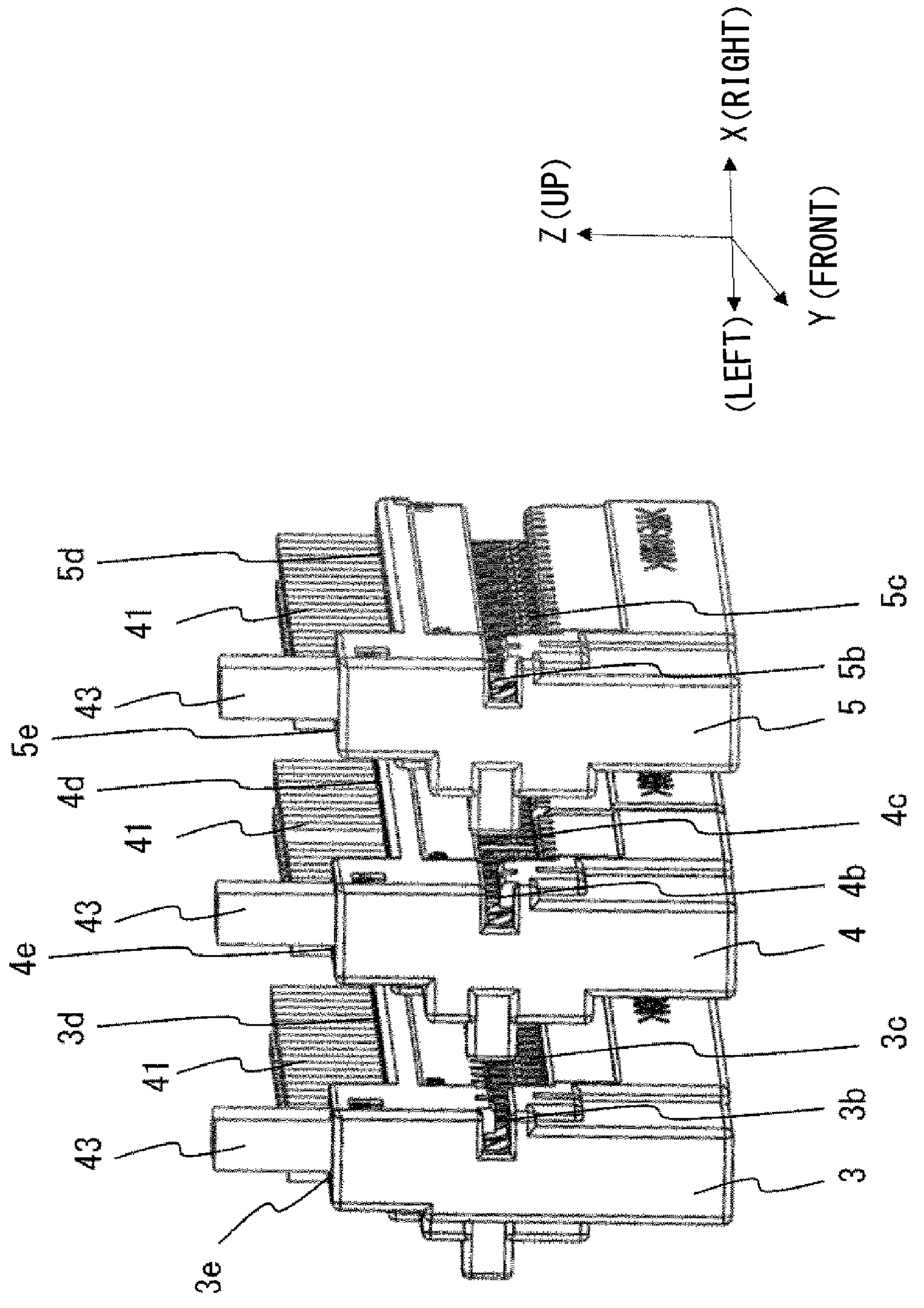
FIG. 4 is a perspective view of the three internal housings viewed from a different direction.

The shape of the first internal housing 3, the shape of the second internal housing 4, and the shape of the third internal housing 5 are similar to but different from one another. FIGS. 3 and 4 are perspective view of the internal housings 3, 4, and 5, and FIG. 5 is a perspective view of the internal housings 3, 4, and 5 viewed from below.

Figure 5:
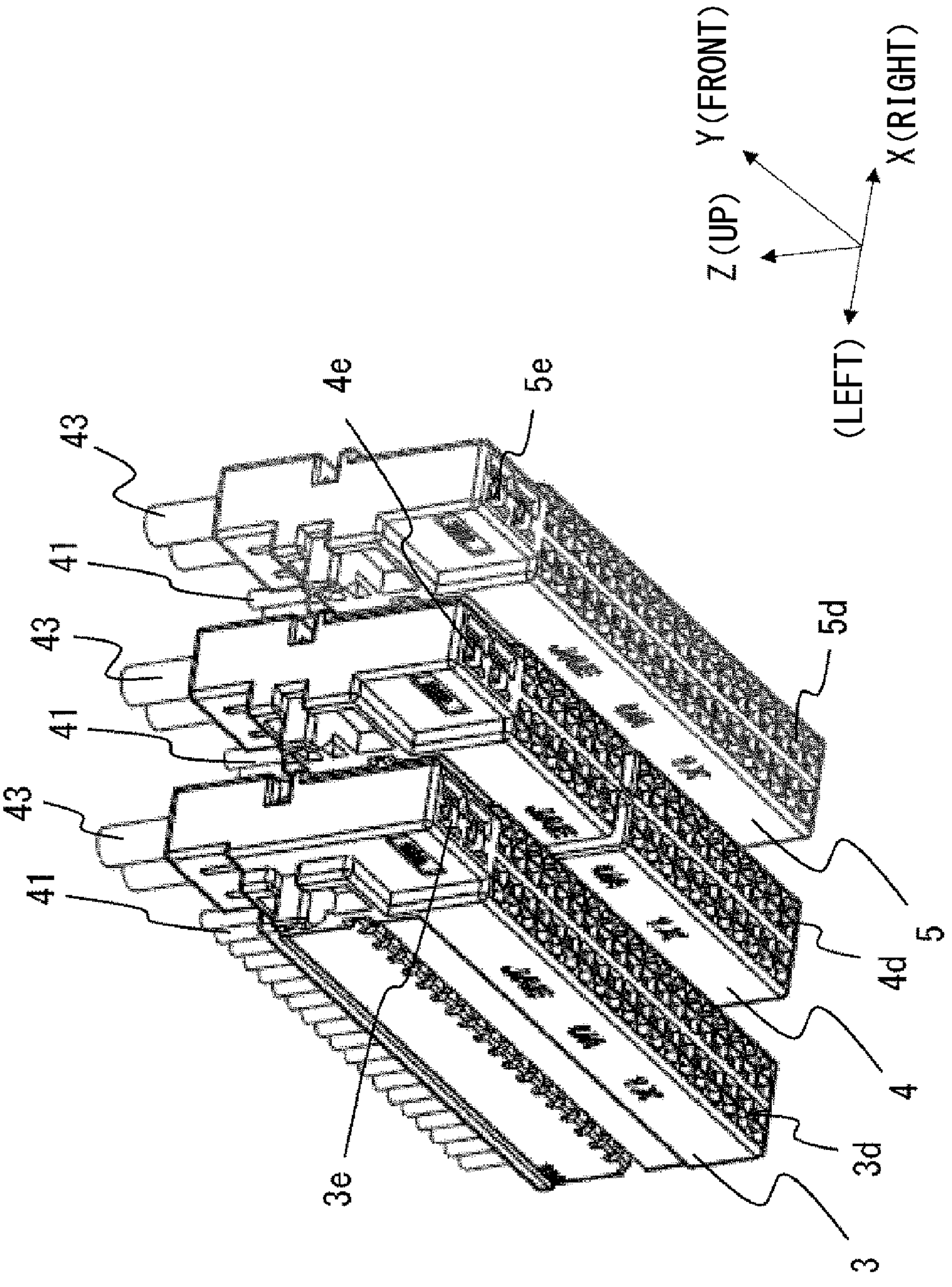
FIG. 5 is a perspective view of the three internal housings viewed from another different direction.

For example, as shown in FIGS. 3, 4, and 5, the internal housings 3, 4, and 5 have holes **3*d*, 3*e*, 4*d*, 4*e*, 5*d*, and 5*e* for insertion of terminals attached to wires. Particularly, as shown in FIG. 5, the number of holes 4*d* in the second internal housing 4 is smaller than the number of holes 3*d* in the first internal housing 3 and the number of holes 5*d* in the third internal housing 5**.

In this manner, the second internal housing 4 has a different structure from the first internal housing 3 and the third internal housing 5. Likewise, the first internal housing 3 and the third internal housing 5 are used distinctively. Thus, it is necessary to accommodate a specified one of the internal housings 3, 4, and 5 into the cavities 11, 12, and 13 of the external housing 2. Specifically, there is a reason why the internal housing 4 or the internal housing 5 should not be inserted into the cavity 11 of the external housing 2. There is a reason why the internal housing 3 or the internal housing 5 should not be inserted into the cavity 12 of the external housing 2. There is a reason why the internal housing 3 or the internal housing 4 should not be inserted into the cavity 13 of the external housing 2. If the correspondence between the cavity and the internal housing is wrong, the correspondence between signal lines connected through the connector 1 is failed, and therefore the basic function of the connector 1 as a junction of signal lines is degraded.

Referring back to FIG. 2, the first cavity 11, the second cavity 12, and the third cavity 13 are formed in the external housing 2. Each of the cavities 11, 12, and 13 is a space surrounded by the inner wall surfaces of the external housing 2.

The cavities 11, 12, and 13 extend in parallel with one another. The direction in which the internal housing 3 is inserted into the cavity 11, the direction in which the internal housing 4 is inserted into the cavity 12, and the direction in which the internal housing 5 is inserted into the cavity 13 are parallel to one another. The cavities 11, 12, and 13 extend in the direction of insertion of the plurality of internal housings 3, 4, and 5. The cavities 11, 12, and 13 extend in this insertion direction.

Figure 7:
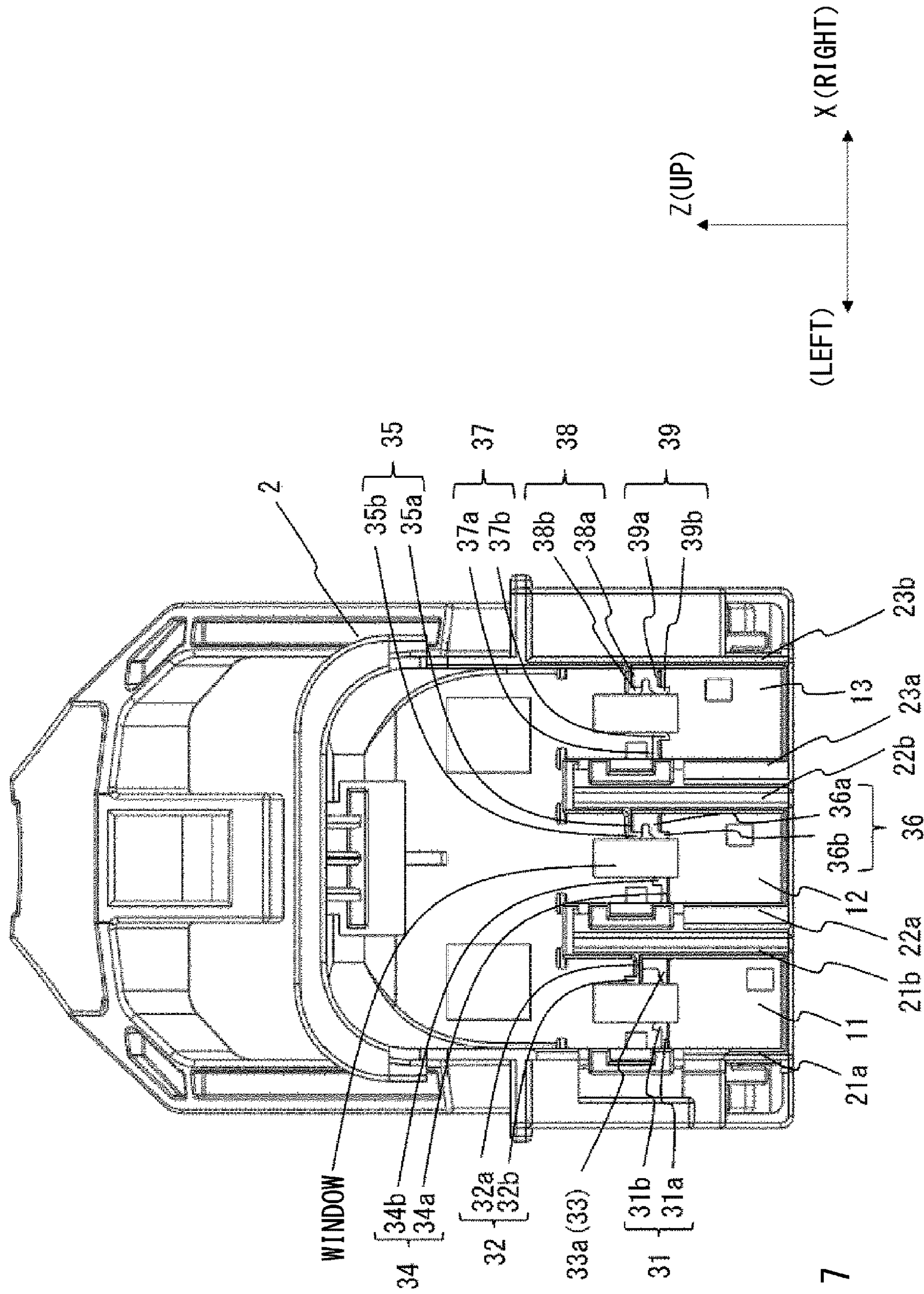
FIG. 7 is a front view of the external housing in which the internal housings are not accommodated.

As shown in FIG. 7, retainers 31, 32, and 33 are formed on the inner wall surface of the first cavity 11. Retainers 34, 35, and 36 are formed on the inner wall surface of the second cavity 12. Retainers 37, 38, and 39 are formed on the inner wall surface of the third cavity 13.

A combination of the shapes of the retainers 31, 32, and 33 formed in the first cavity 11, a combination of the shapes of the retainers 34, 35, and 36 formed in the second cavity 12, and a combination of the shapes of the retainers 37, 38, and 39 formed in the third cavity 13 are different from one another.

Referring back to FIG. 2, the direction in which the cavities 11, 12, and 13 extend is referred to as a Y direction, and the direction in which the cavities 11, 12, and 13 are arranged next to one another is referred to as an X direction. The X direction and the Y direction are orthogonal to each other. Further, to simplify the description, it is assumed that the X direction and the Y direction are parallel, and the vertical direction orthogonal to both of the X direction and the Y direction is referred to as a Z direction.

Note that the X direction, the Y direction, and the Z direction are used as a coordinate system when describing the structure of the internal housings 3, 4, and 5 accommodated in the cavities 11, 12, and 13, respectively. Further, as described later, the Y direction is described as the front (forward) and back (backward) direction, the X direction as the horizontal direction, and the Z direction as the vertical direction in some cases.

The first cavity 11 has an opening so that the first internal housing 3 can be inserted by sliding in the Y direction. Note that the side in the Y direction on which the first cavity 11 opens so that the first internal housing 3 can be inserted is the front side, and the side in the opposite direction is the back side. A wall surface is formed on the back side.

Figure 6:
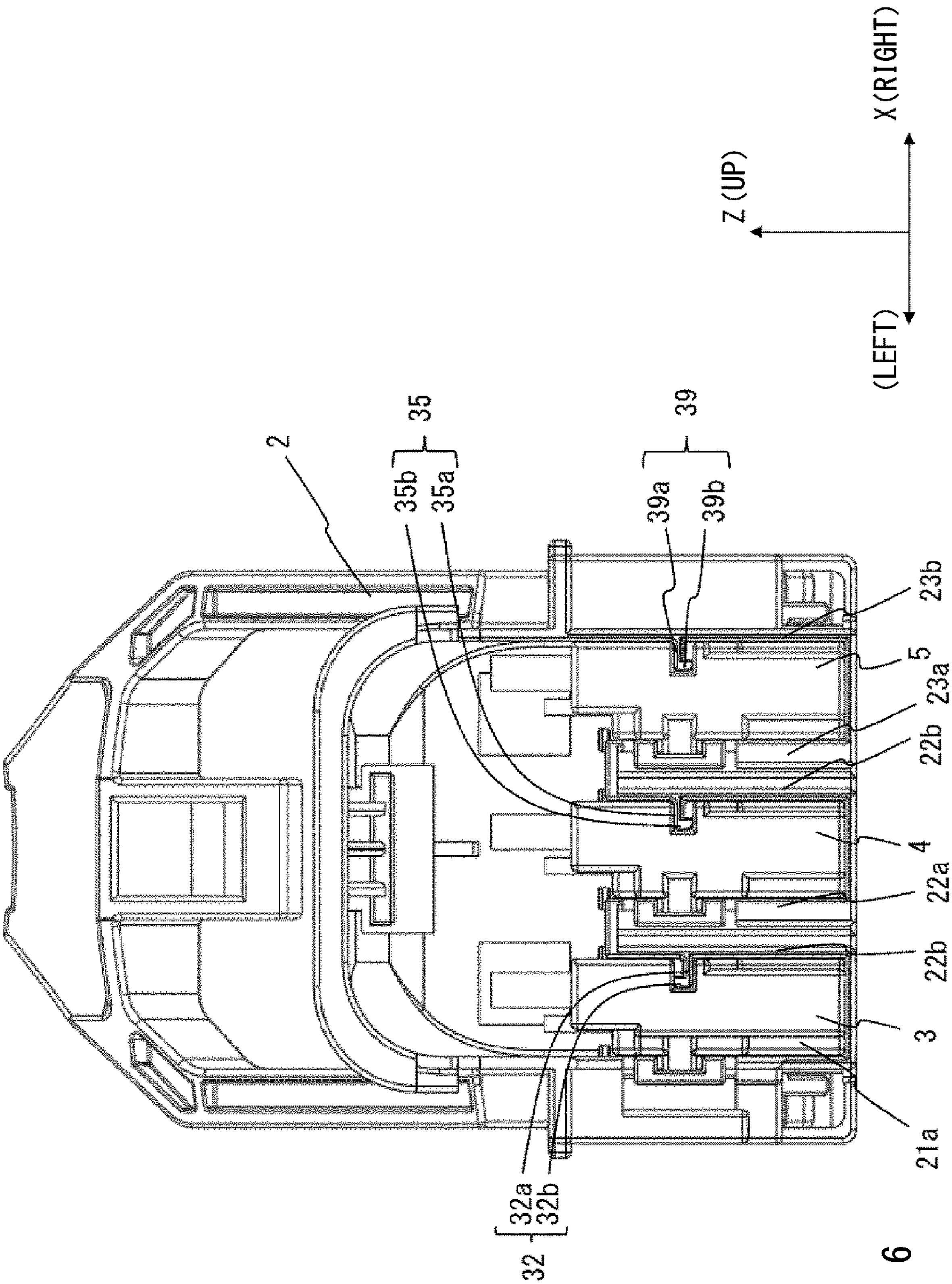
FIG. 6 is a front view of the external housing in which the internal housings are accommodated.

FIG. 6 is a view from the front side showing an example of the state where the first internal housing 3 is accommodated in the first cavity 11, the second internal housing 4 is accommodated in the second cavity 12, and the third internal housing 5 is accommodated in the third cavity 13. On the other hand, FIG. 7 is a view from the front side showing an example of the state where none of the internal housings 3, 4, and 5 is accommodated in the cavities 11, 12, and 13 of the external housing 2.

As shown in FIGS. 1, 2, 6 and 7, the first cavity 11 is on the left side when viewed from the front side, the second cavity 12 is at the center when viewed from the front side, and the third cavity 13 is on the right side when viewed from the front side, they are arranged in the X direction with their positions in the Z direction aligned. In other words, the second cavity 12 is interposed between the first cavity 11 and the third cavity 13 in the X direction.

As shown in FIG. 7, the first cavity 11 includes a space between a left side wall surface 21*a* on which the left retainer 31 is formed and a right side wall surface 21*b* on which the upper right retainer 32 and the lower right retainer 33 are formed. The first cavity 11 may include the upper part of the space between the left side wall surface 21*a* and the right side wall surface 21*b*.

The left side wall surface 21*a* and the right side wall surface 21*b* are inner side surfaces of the external housing 2, which extend in the Y direction and are opposed to each other. Thus, the state where the first internal housing 3 is accommodated in the first cavity 11 is the state where the first internal housing 3 is inserted between the left side wall surface 21*a* and the right side wall surface 21*b* from the front side, and the first internal housing 3 is interposed and fixed between the left side wall surface 21*a* and the right side wall surface 21*b*.

Thus, as shown in FIG. 6, when the first internal housing 3 is accommodated in the first cavity 11, the most part of the first internal housing 3 is interposed between the left side wall surface 21*a* and the right side wall surface 21*b*, and a part of the first internal housing 3 is disposed in the space above the space between the left side wall surface 21*a* and the right side wall surface 21*b*.

Likewise, as shown in FIG. 7, the second cavity 12 has an opening so that the second internal housing 4 can be inserted from the front side. The third cavity 13 has an opening so that the third internal housing 5 can be inserted from the front side. Wall surfaces are formed on the back side.

The second cavity 12 is a space including the space between a left side wall surface 22*a* and a right side wall surface 22*b*. The left side wall surface 22*a* and the right side wall surface 22*b* are inner side surfaces of the external housing 2, which extend in the Y direction and are opposed to each other. The state where the second internal housing 4 is accommodated in the second cavity 12 is the state where the second internal housing 4 is inserted between the left side wall surface 22*a* and the right side wall surface 22*b* from the front side, and the second internal housing 4 is interposed and fixed between the left side wall surface 22*a* and the right side wall surface 22*b*.

Thus, as shown in FIG. 6, when the second internal housing 4 is accommodated in the second cavity 12, the most part of the second internal housing 4 is interposed between the left side wall surface 22*a* and the right side wall surface 22*b*, and a part of the second internal housing 4 is disposed in the space above the space between the left side wall surface 22*a* and the right side wall surface 22*b*.

Likewise, as shown in FIG. 7, the third cavity 13 is a space including the space between a left side wall surface 23*a* and a right side wall surface 23*b*. The left side wall surface 23*a* and the right side wall surface 23*b* are inner side surfaces of the external housing 2, which extend in the Y direction and are opposed to each other. The state where the third internal housing 5 is accommodated in the third cavity 13 is the state where the third internal housing 5 is inserted between the left side wall surface 23*a* and the right side wall surface 23*b* from the front side, and the third internal housing 5 is interposed and fixed between the left side wall surface 23*a* and the right side wall surface 23*b*.

Thus, as shown in FIG. 6, when the third internal housing 5 is accommodated in the third cavity 13, the most part of the third internal housing 5 is interposed between the left side wall surface 23*a* and the right side wall surface 23*b*, and a part of the third internal housing 5 is disposed in the space above the space between the left side wall surface 23*a* and the right side wall surface 23*b*.

Note that, as shown in FIG. 7, the wall surface on the back side of the external housing 2 has a window for pressing the internal housings 3, 4, and 5 from the back side to the front side of the external housing 2 when removing the internal housings 3, 4, and 5 accommodated in the external housing 2.

For example, an identification part (identification mark) is placed at the end on the inserting side (the distal end in the insertion direction) of the internal housings 3, 4, and 5, so that a worker can check the identification part through the window in the wall surface on the back side of the external housing 2. A worker can thereby identify the internal housing to be inserted into the external housing 2 from the outside of the wall surface on the back side of the external housing 2.

FIGS. 8 to 10, FIGS. 17 to 28, and FIGS. 31 to 39 are front views or cross-sectional views when viewed from the front schematically showing the external housing 2 and the internal housings 3, 4, and 5.

Figure 8:
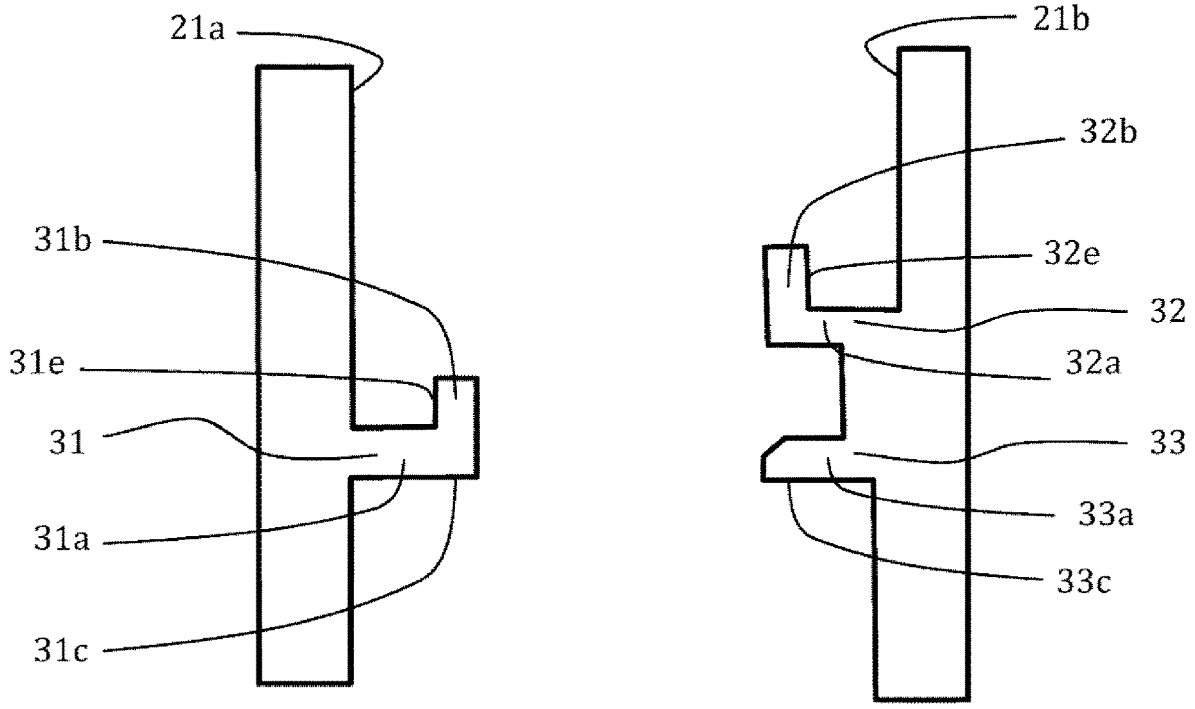
FIG. 8 is a view showing retainers of a first cavity.

As shown in FIG. 8, the left retainer 31 that projects inward from the left side wall surface 21*a* and the upper right retainer 32 and the lower right retainer 33 that project inward from the right side wall surface 21*b* in the first cavity 11 are described hereinafter.

The left retainer 31 includes a horizontal part 31*a* projecting inward from the left side wall surface 21*a* and a vertical part 31*b* projecting vertically from the distal end of the horizontal part 31*a*. The horizontal part 31*a* is one specific example of a retainer first projecting part. The vertical part 31*b* is one specific example of a retainer second projecting part.

Note that the retainer second projecting part is joined to the distal end of the retainer first projecting part and projects in a different direction from the projecting direction of the retainer first projecting part. The same applies to horizontal parts and vertical parts of the retainers 32 to 39, which are described later.

Note that the horizontal part 31*a* and the vertical part 31*b* have shapes extending in the Y direction. In other words, the horizontal part 31*a* and the vertical part 31*b* have shapes extending along the accommodation direction when the first internal housing 3 is accommodated in the first cavity 11.

The horizontal part 31*a* projects rightward. The vertical part 31*b* is formed to project upward from the distal end of the horizontal part 31*a*.

The upper right retainer 32 includes a horizontal part 32*a* projecting inward from the right side wall surface 21*b* and a vertical part 32*b* projecting from the distal end of the horizontal part 32*a* in a different direction from the projecting direction of the horizontal part 32*a*. The horizontal part 32*a* and the vertical part 32*b* have shapes extending along the accommodation direction when the first internal housing 3 is accommodated in the first cavity 11.

The horizontal part 32*a* projects leftward. The vertical part 32*b* is formed to project upward from the distal end of the horizontal part 32*a*.

The lower right retainer 33 includes a horizontal part 33*a* projecting inward from the right side wall surface 21*b*. The horizontal part 33*a* has a shape extending along the accommodation direction when the first internal housing 3 is accommodated in the first cavity 11.

The horizontal part 33*a* projects leftward. No vertical part is formed in the horizontal part 33*a* of the lower right retainer 33.

The upper right retainer 32 is formed to be longer than the lower right retainer 33 in the Y direction. Thus, the end on the front side of the upper right retainer 32 projects more than the end on the front side of the lower right retainer 33 in the front direction.

The upper right retainer 32 and the lower right retainer 33 are formed parallel to each other, and the upper right retainer 32 is formed above the lower right retainer 33. Further, it is assumed that the left retainer 31 and the lower right retainer 33 are formed at substantially the same positions in the Z direction.

Thus, the upper right retainer 32 is formed above the left retainer 31 and the lower right retainer 33.

Figure 9:
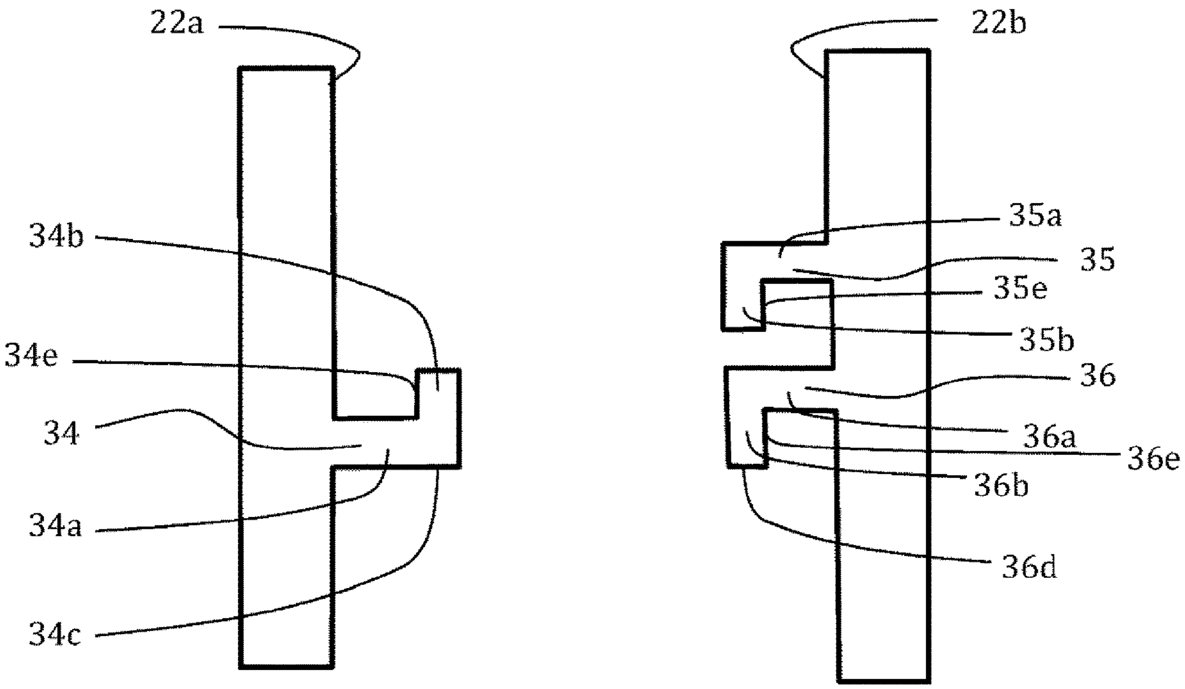
FIG. 9 is a view showing retainers of a second cavity.

As shown in FIG. 9, the left retainer 34 that projects inward from the left side wall surface 22*a* is formed on the left side wall surface 22*a* of the second cavity 12. The upper right retainer 35 and the lower right retainer 36 that project inward from the right side wall surface 22*b* are formed on the right side wall surface 22*b* of the second cavity 12.

The left retainer 34 includes a horizontal part 34*a* projecting inward from the left side wall surface 22*a* and a vertical part 34*b* projecting from the distal end of the horizontal part 34*a* in a different direction from the projecting direction of the horizontal part 34*a*. The horizontal part 34*a* and the vertical part 34*b* have shapes extending along the accommodation direction when the second internal housing 4 is accommodated in the second cavity 12.

The horizontal part 34*a* projects rightward. The vertical part 34*b* is formed to project upward from the distal end of the horizontal part 34*a*.

The upper right retainer 35 includes a horizontal part 35*a* projecting inward from the right side wall surface 22*b* and a vertical part 35*b* projecting from the distal end of the horizontal part 35*a* in a different direction from the projecting direction of the horizontal part 35*a*. The horizontal part 35*a* and the vertical part 35*b* have shapes extending along the accommodation direction when the second internal housing 4 is accommodated in the second cavity 12.

The horizontal part 35*a* projects leftward. The vertical part 35*b* is formed to project downward from the distal end of the horizontal part 35*a*.

Note that, in the upper right retainer 35, the vertical part 35*b* may be formed only partly on the front side and not formed on the back side.

The lower right retainer 36 includes a horizontal part 36*a* projecting inward from the right side wall surface 22*b* and a vertical part 36*b* projecting from the distal end of the horizontal part 36*a* in a different direction from the projecting direction of the horizontal part 36*a*. The horizontal part 36*a* and the vertical part 36*b* have shapes extending along the accommodation direction when the second internal housing 4 is accommodated in the second cavity 12.

The horizontal part 36*a* projects leftward. The vertical part 36*b* is formed to project downward from the distal end of the horizontal part 36*a*.

The upper right retainer 35 is formed to be longer than the lower right retainer 36 in the Y direction. Thus, the end on the front side of the upper right retainer 35 projects more than the end on the front side of the lower right retainer 36 in the front direction.

The upper right retainer 35 and the lower right retainer 36 are formed parallel to each other, and the upper right retainer 35 is formed above the lower right retainer 36. Further, it is assumed that the left retainer 34 and the lower right retainer 36 are formed at substantially the same positions in the Z direction.

Thus, the upper right retainer 35 is formed above the left retainer 34 and the lower right retainer 36.

Figure 10:
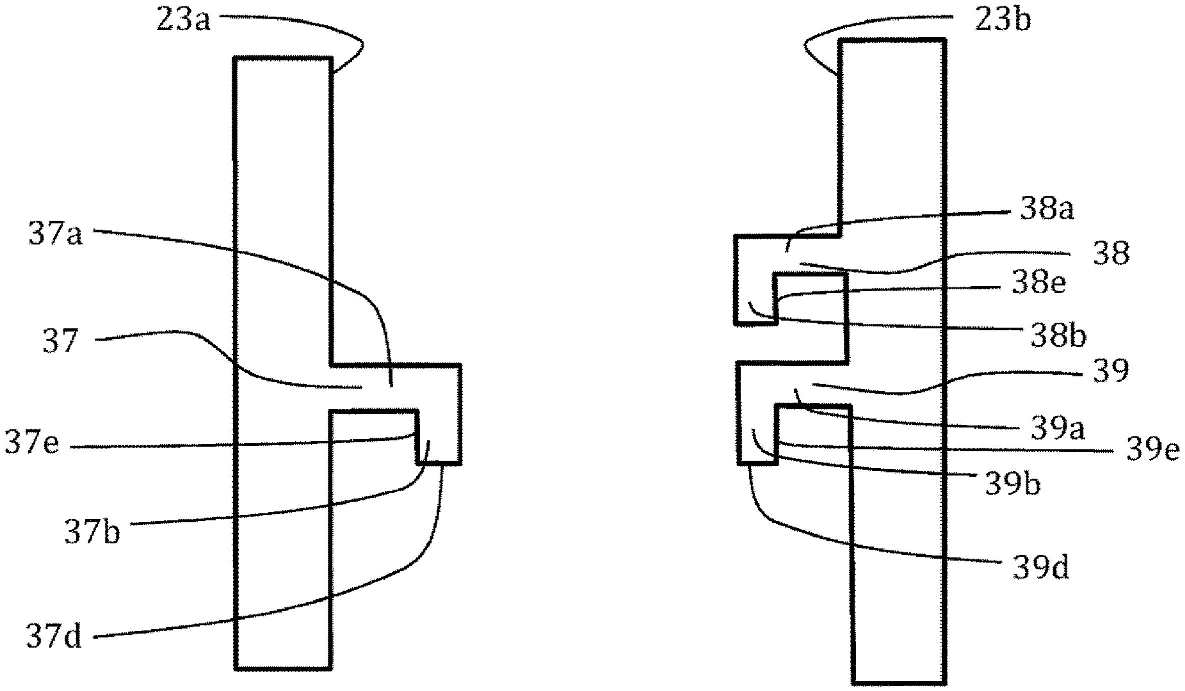
FIG. 10 is a view showing retainers of a third cavity.

As shown in FIG. 10, the left retainer 37 that projects inward from the left side wall surface 23*a* is formed on the left side wall surface 23*a* of the third cavity 13. The upper right retainer 38 that projects inward from the right side wall surface 23*b* is formed on the right side wall surface 23*b* of the third cavity 13.

The left retainer 37 includes a horizontal part 37*a* projecting inward from the left side wall surface 23*a* and a vertical part 37*b* projecting from the distal end of the horizontal part 37*a* in a different direction from the projecting direction of the horizontal part 37*a*. The horizontal part 37*a* and the vertical part 37*b* have shapes extending along the accommodation direction when the third internal housing 5 is accommodated in the third cavity 13.

The horizontal part 37*a* projects rightward. The vertical part 37*b* is formed to project downward from the distal end of the horizontal part 37*a*.

The upper right retainer 38 includes a horizontal part 38*a* projecting inward from the right side wall surface 23*b* and a vertical part 38*b* projecting from the distal end of the horizontal part 38*a* in a different direction from the projecting direction of the horizontal part 38*a*. The horizontal part 38*a* and the vertical part 38*b* have shapes extending along the accommodation direction when the third internal housing 5 is accommodated in the third cavity 13.

The horizontal part 38*a* projects leftward. The vertical part 38*b* is formed to project downward from the distal end of the horizontal part 38*a*. Note that, in the upper right retainer 38, the vertical part 38*b* may be formed only partly on the front side and not formed on the back side.

The lower right retainer 39 includes a horizontal part 39*a* projecting inward from the right side wall surface 23*b* and a vertical part 39*b* projecting from the distal end of the horizontal part 39*a* in a different direction from the projecting direction of the horizontal part 39*a*. The horizontal part 39*a* and the vertical part 39*b* have shapes extending along the accommodation direction when the third internal housing 5 is accommodated in the third cavity 13.

The horizontal part 39*a* projects leftward. The vertical part 39*b* is formed to project downward from the distal end of the horizontal part 39*a*.

The upper right retainer 38 is formed to be longer than the lower right retainer 39 in the Y direction. Thus, the end on the front side of the upper right retainer 38 projects more than the end on the front side of the lower right retainer 39 in the front direction.

The upper right retainer 38 and the lower right retainer 39 are formed parallel to each other, and the upper right retainer 38 is formed above the lower right retainer 39. Further, it is assumed that the left retainer 37 and the lower right retainer 39 are formed at substantially the same positions in the Z direction.

Thus, the upper right retainer 38 is formed above the left retainer 37 and the lower right retainer 39.

Thus, a combination of the projecting directions of the vertical parts is as follows.

First, a focus is placed on a combination of the left retainers 31, 34, and 37, and the upper right retainers 32, 35, and 38 in each of the cavities 11, 12, and 13.

In the first cavity 11, the vertical part 31*b* of the left retainer 31 projects upward, and the vertical part 32*b* of the upper right retainer 32 projects upward, which are a combination of "up:up" Likewise, the directions of the vertical parts 34*b* and 35*b* of the retainers 34 and 35 in the second cavity 12 are a combination of "up:down", and the directions of the vertical parts 37*b* and 38*b* of the retainers 37 and 38 in the third cavity 13 are a combination of "down:down".

In this manner, a combination of the projecting directions of the vertical parts 31*b* and 32*b* of the retainers 31 and 32 in the first cavity 11, a combination of the projecting directions of the vertical parts 34*b* and 35*b* of the retainers 34 and 35 in the second cavity 12, and a combination of the projecting directions of the vertical parts 37*b* and 38*b* of the retainers 37 and 38 in the third cavity 13 are different from one another.

The same applies to the case where a focus is placed on a combination of the left retainers 31, 34, and 37, the upper right retainers 32, 35, and 38, and the lower right retainers 33, 36, and 39 in each of the cavities 11, 12, and 13.

To be specific, as shown in FIG. 8, since there is no vertical part in the lower right retainer 33, a combination of the directions of the vertical parts 31*b* and 32*b* of the retainers 31 and 32 in the first cavity 11 and a vertical part that does not exist in the lower right retainer 33 is "up:up: n/a". As shown in FIG. 9, the directions of the vertical parts 34*b*, 35*b*, and 36*b* of the retainers 34, 35, and 36 in the second cavity 12 are a combination of "up:down:down". As shown in FIG. 10, the directions of the vertical parts 37*b*, 38*b*, and 39*b* of the retainers 37, 38, and 39 in the third cavity 13 are a combination of "down:down:down". Thus, the combination in the cavity 11, the combination in the cavity 12, and the combination in the cavity 13 are different from one another.

As shown in FIGS. 8 and 10, the horizontal part 31*a* of the left retainer 31 is slightly lower than the horizontal part 37*a* of the left retainer 37. As shown in FIGS. 9 and 10, the same applies to the left retainer 34, and the horizontal part 34*a* is slightly lower than the horizontal part 37*a* of the left retainer 37. Specifically, as shown in FIGS. 8 to 10, when comprising the left retainers 31, 34, and 37 of the respective cavities 11, 12, and 13, the position in the Z direction of the horizontal part of the retainer having the vertical part projecting downward is slightly upper than the position in the Z direction of the horizontal part of the retainer having the vertical part projecting upward.

The same applies to the upper right retainer 32, 35, and 38 and the lower right retainers 36 and 39. Although the lower right retainer 33 does not have the vertical part, the same as the case with the vertical part projecting upward applies to the lower right retainer 33. Specifically, the position in the Z direction of the horizontal part 33*a* is slightly lower than that of the horizontal part 36*a* of the lower right retainer 36 and the horizontal part 39*a* of the lower right retainer 39.

The structures of the internal housings 3, 4, and 5 are described hereinafter with reference to FIGS. 3 to 5, FIGS. 11 to 16, and FIGS. 17 to 22. FIGS. 11 to 16 are views showing the left side surfaces and the right side surfaces of the internal housings 3, 4, and 5.

Figure 17:
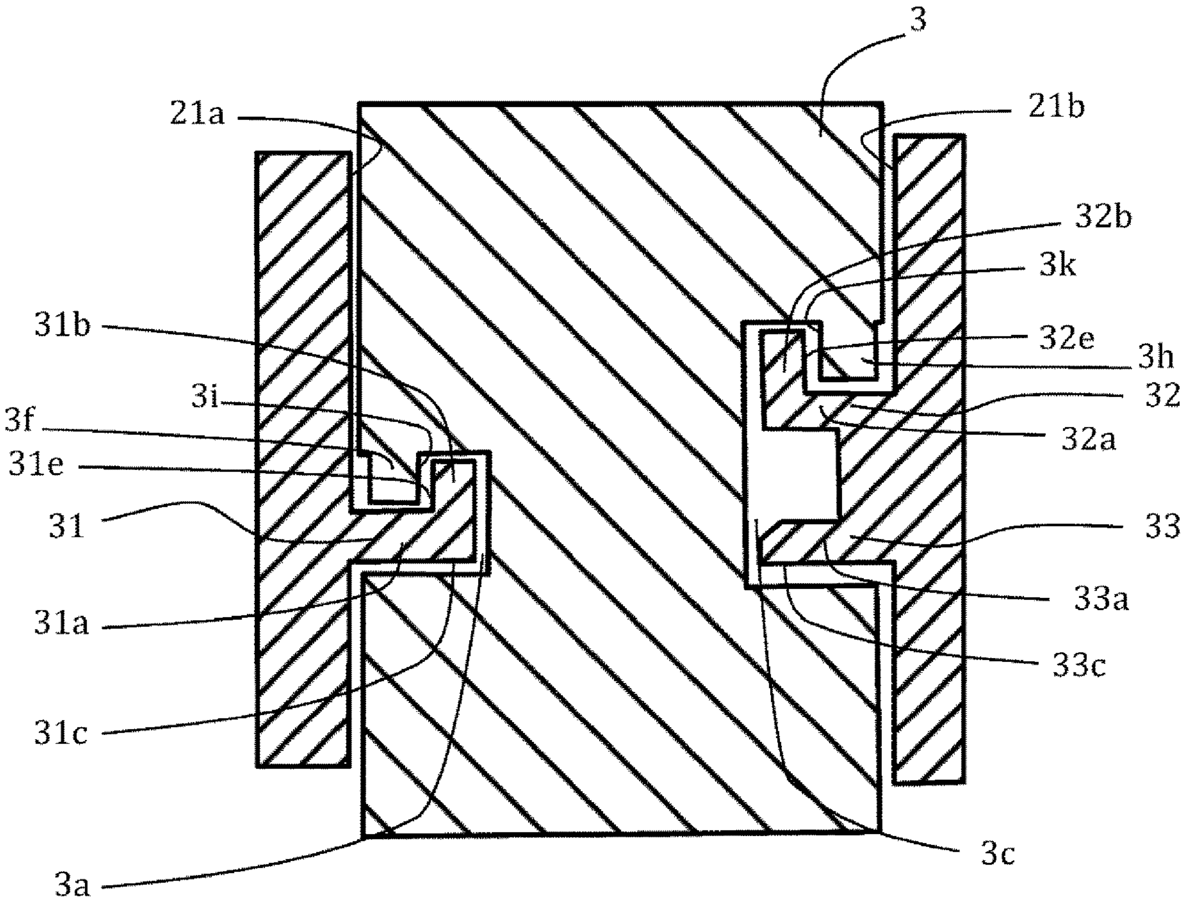
FIG. 17 is a view showing an example of the cross section of the first internal housing stored in the first cavity on the back side.
Figure 18:
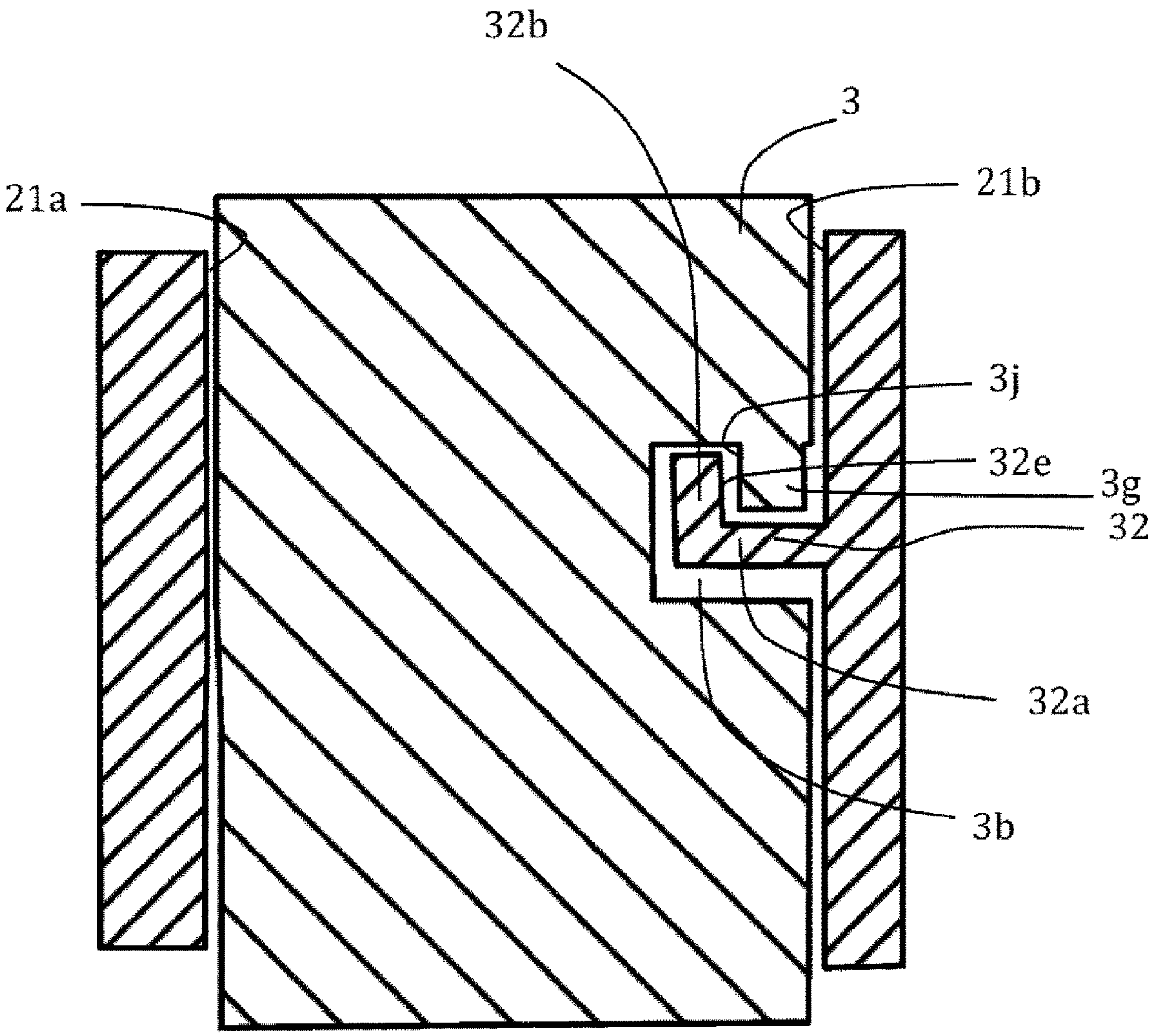
FIG. 18 is a view showing an example of the cross section of the first internal housing stored in the first cavity on the front side.

FIG. 17 is a view showing, from the front side, the X-Z cross section (the cross section A in FIG. 11) on the back side in the Y direction of the first internal housing 3 and the external housing 2, and FIG. 18 is a view showing, from the front side, the X-Z cross section (the cross section B in FIG. 11) near the front side in the Y direction of the first internal housing 3 and the external housing 2.

Figure 19:
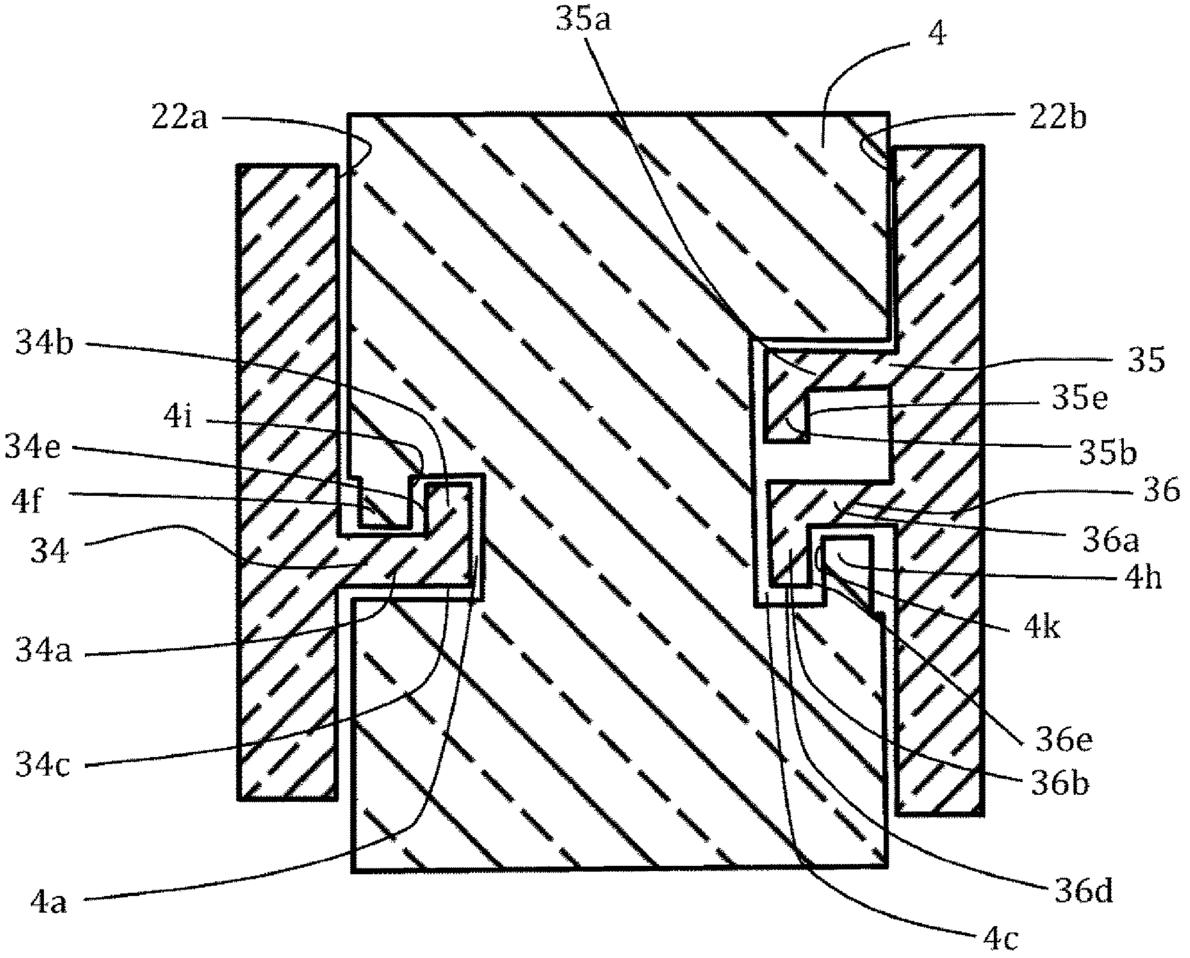
FIG. 19 is a view showing an example of the cross section of the second internal housing stored in the second cavity on the back side.
Figure 20:
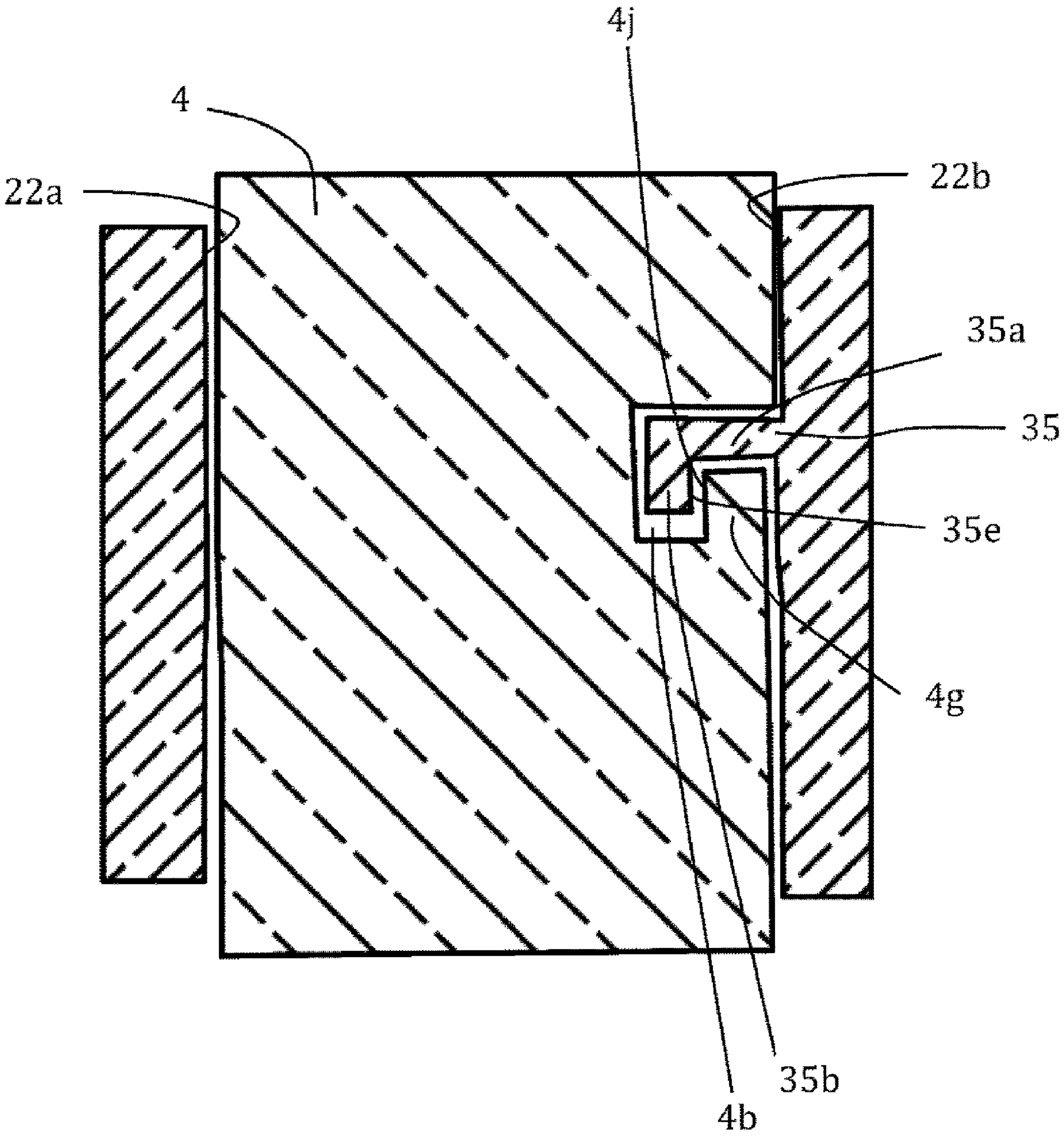
FIG. 20 is a view showing an example of the cross section of the second internal housing stored in the second cavity on the front side.

Likewise, FIG. 19 is a view showing, from the front side, the X-Z cross section (the cross section C in FIG. 12) on the back side in the Y direction of the second internal housing 4 and the external housing 2, and FIG. 20 is a view showing, from the front side, the X-Z cross section (the cross section D in FIG. 12) near the back side in the Y direction of the second internal housing 4 and the external housing 2.

Figure 21:
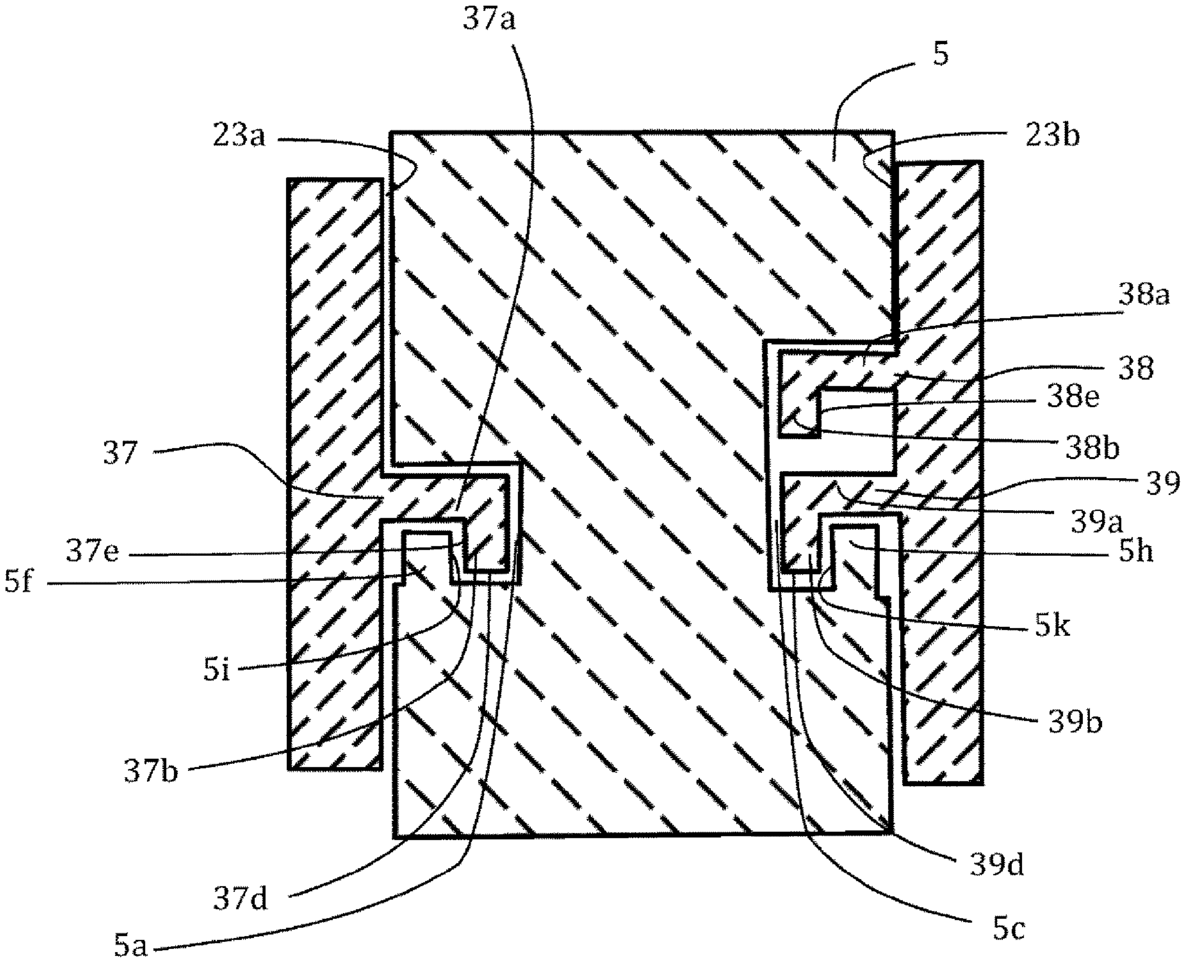
FIG. 21 is a view showing an example of the cross section of the third internal housing stored in the third cavity on the back side.
Figure 22:
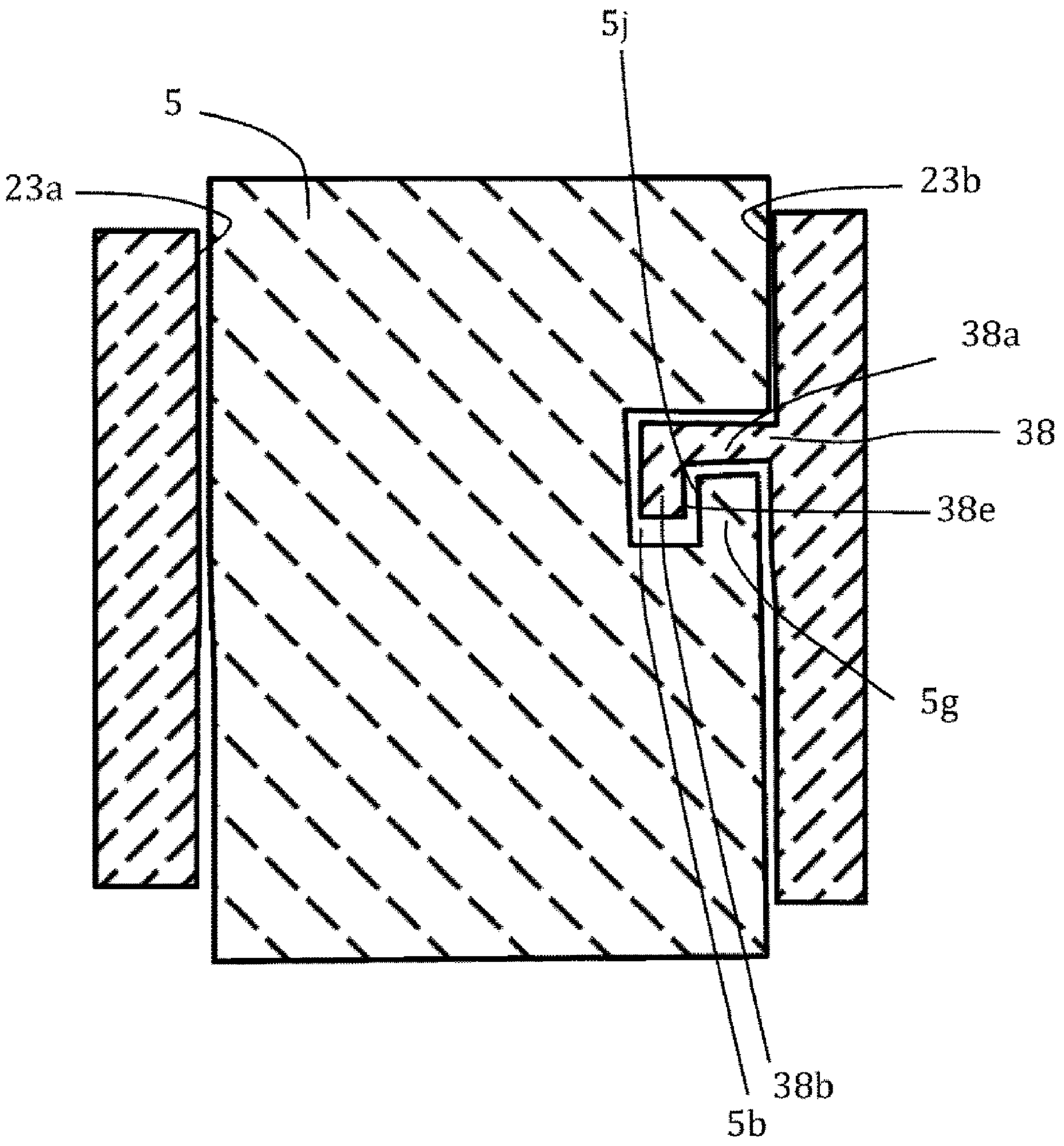
FIG. 22 is a view showing an example of the cross section of the third internal housing stored in the third cavity on the front side.

Likewise, FIG. 21 is a view showing, from the front side, the X-Z cross section (the cross section E in FIG. 13) on the back side in the Y direction of the third internal housing 5 and the external housing 2, and FIG. 22 is a view showing, from the front side, the X-Z cross section (the cross section F in FIG. 13) near the back side in the Y direction of the third internal housing 5 and the external housing 2.

As shown in FIGS. 3 to 5, the first internal housing 3 is formed to be long in the Y direction. Note that, as shown in FIGS. 1 and 6, the first internal housing 3 is inserted into the first cavity 11 along the Y direction and thereby accommodated in the first cavity 11.

As shown in FIGS. 3 to 5 and FIGS. 11 and 12, the first internal housing 3 has a groove part 3*a* on its left outer side surface, groove parts 3*b* and 3*c* on its right outer side surface, and two types of holes 3*d* and 3*e* that vertically penetrate the first internal housing 3. Each of the two types of holes 3*d* and 3*e* includes a plurality of holes.

Figure 11:
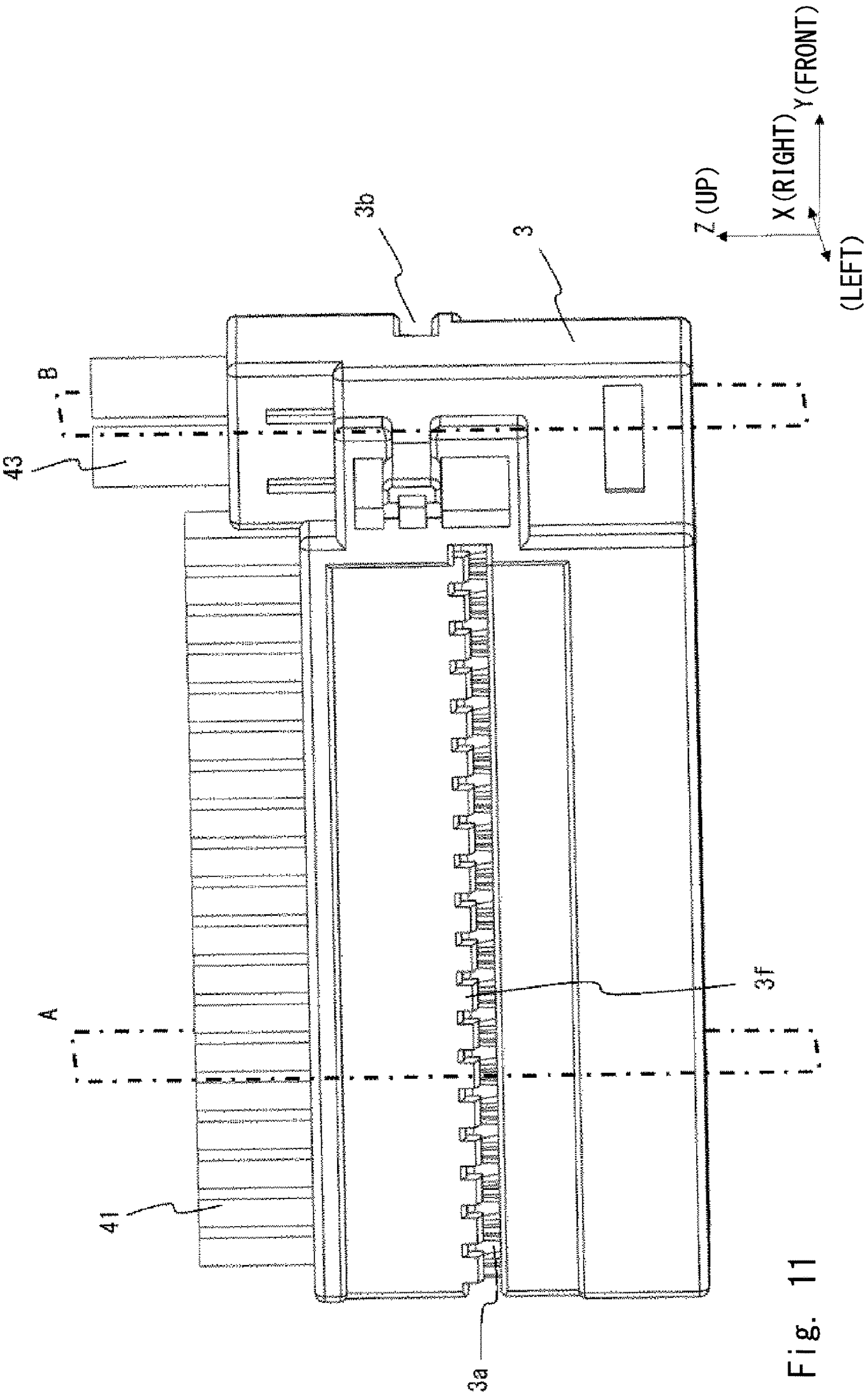
FIG. 11 is a left side view of a first internal housing.

As shown in FIG. 11, the left side surface of the first internal housing 3 has the groove part 3*a* that is recessed rightward in the X direction when viewed from the front side. Stated differently, the groove part 3*a* has a shape where a part of the left side surface of the first internal housing is recessed inward in the X direction and this recess is elongated in the Y direction.

As shown in FIG. 17, the groove part 3*a* is formed at the position corresponding to the left retainer 31 when the first internal housing 3 is accommodated in the first cavity 11.

As shown in FIG. 11, in the groove part 3*a*, a projecting part 3*f* projecting downward from the upper surface is formed to extend in the Y direction. Note that the projecting part 3*f* may have slits at predetermined intervals in the Y direction.

Figure 14:
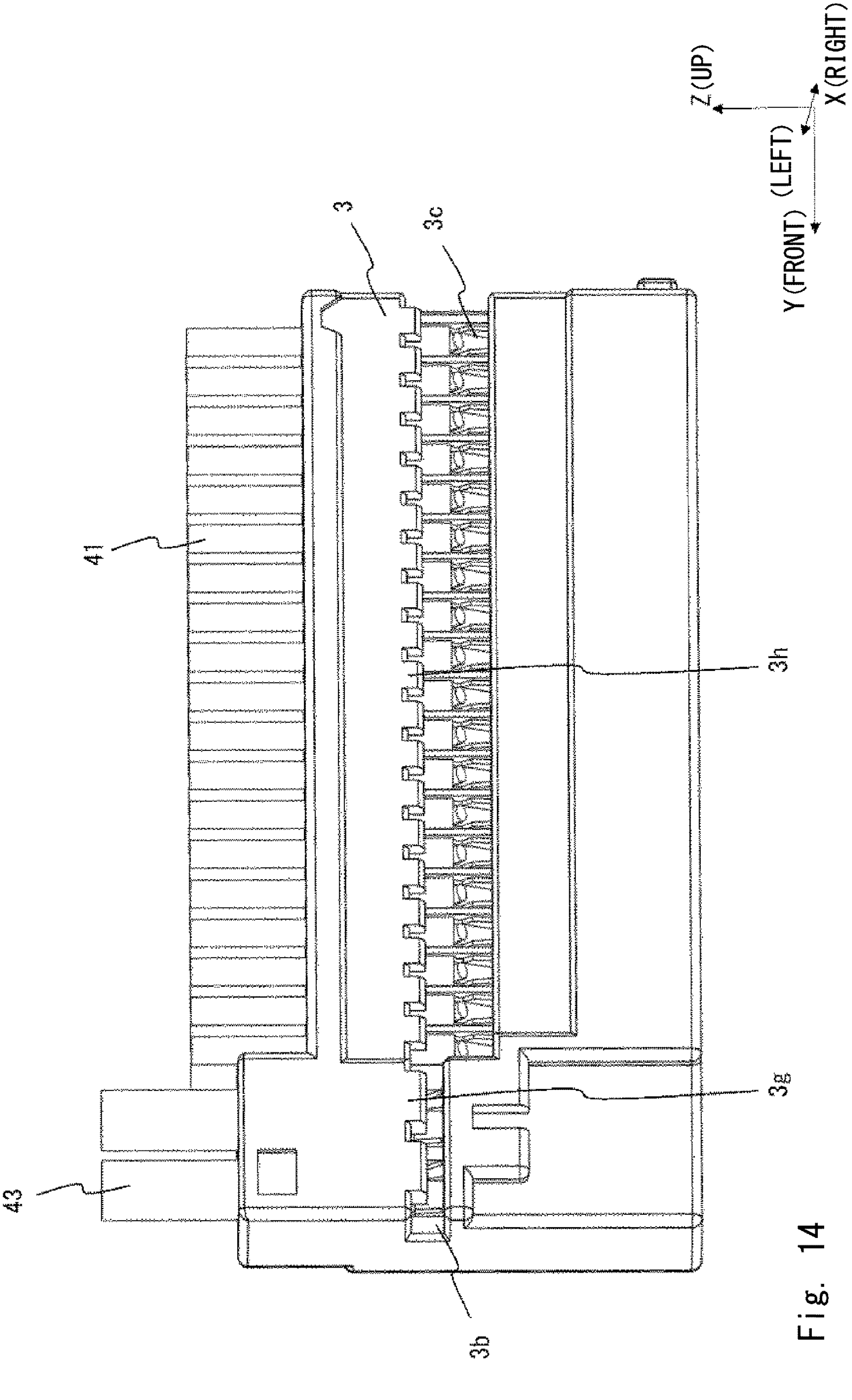
FIG. 14 is a right side view of the first internal housing.

As shown in FIG. 14, the right side surface of the first internal housing 3 has the two groove parts 3*b* and 3*c* that are recessed leftward in the X direction when viewed from the front side. Note that the groove part 3*b* is on the front side relative to the groove part 3*c*. The groove part 3*b* and the groove part 3*c* are integrally formed.

As shown in FIG. 18, the groove part 3*b* is formed at the position corresponding to the upper right retainer 32 when the first internal housing 3 is accommodated in the first cavity 11.

As shown in FIG. 17, the groove part 3*c* is formed at the position corresponding to the lower right retainer 33 when the first internal housing 3 is accommodated in the first cavity 11.

As shown in FIG. 14, in the groove part 3*b*, a projecting part 3*g* projecting downward from the upper surface is formed. In the groove part 3*c*, a projecting part 3*h* projecting downward from the upper surface is formed.

Each of the projecting part 3*g* and the projecting part 3*h* has a shape extending in the Y direction. Note that the projecting part 3*g* and the projecting part 3*h* may have slits at predetermined intervals in the Y direction. The projecting part 3*g* and the projecting part 3*h* are formed on a straight line.

As shown in FIG. 14, the groove part 3*b* is formed only near the front side of the first internal housing 3, and the back side of the groove part 3*b* is continuous with the groove part 3*c*. Further, the vertical position in the Z direction of the bottom surface of the groove part 3*b* is upper than the bottom surface of the groove part 3*c*.

As shown in FIG. 17, the projecting part 3*f* does not physically interfere with the left retainer 31 when the first internal housing 3 is accommodated into the first cavity 11. Thus, the projecting part 3*f* does not inhibit the accommodation of the first internal housing 3 into the first cavity 11.

In this case, the left retainer 31 is inserted into the groove part 3*a* in the state where a right side surface 3*i* of the projecting part 3*f* is opposed to a left side surface 31*e* of the vertical part 31*b* of the left retainer 31.

Thus, when a force that brings the right side surface 3*i* of the projecting part 3*f* into contact with the left side surface 31*e* of the vertical part 31*b* is applied, the right side surface 3*i* of the projecting part 3*f* acts as a hook to receive the left side surface 31*e* of the vertical part 31*b*.

As shown in FIG. 14, a plurality of projecting parts 3*g* and a plurality of projecting parts 3*h* are aligned along the Y direction.

As shown in FIGS. 17 and 18, the projecting part 3*g* and the projecting part 3*h* do not physically interfere with the upper right retainer 32 when the first internal housing 3 is accommodated into the first cavity 11. Further, the projecting part 3*h* does not physically interfere with the lower right retainer 33, and also the projecting part 3*g* does not physically interfere with the lower right retainer 33.

Thus, the projecting part 3*g* and the projecting part 3*h* do not inhibit the accommodation of the first internal housing 3 into the first cavity 11.

As shown in FIGS. 17 and 18, the groove part 3*a* having the projecting part 3*f* has a shape that is complementary to that of the left retainer 31 of the first cavity 11, which is the corresponding cavity. Further, the groove part 3*b* having the projecting part 3*g* and the groove part 3*c* having the projecting part 3*h* have shapes that are complementary to those of the upper right retainer 32 and the lower right retainer 33 of the first cavity 11.

Further, as shown in FIGS. 17 and 18, a left side surface 3*j* of the projecting part 3*g* is opposed to a right side surface 32*e* of the vertical part 32*b* of the upper right retainer 32. When the left side surface 3*j* of the projecting part 3*g* comes into contact with the right side surface 32*e* of the vertical part 32*b*, the left side surface 3*j* of the projecting part 3*g* acts as a hook to receive the right side surface 32*e* of the vertical part 32*b*.

The same applies to the second internal housing 4 to be inserted into the second cavity 12.

Figure 12:
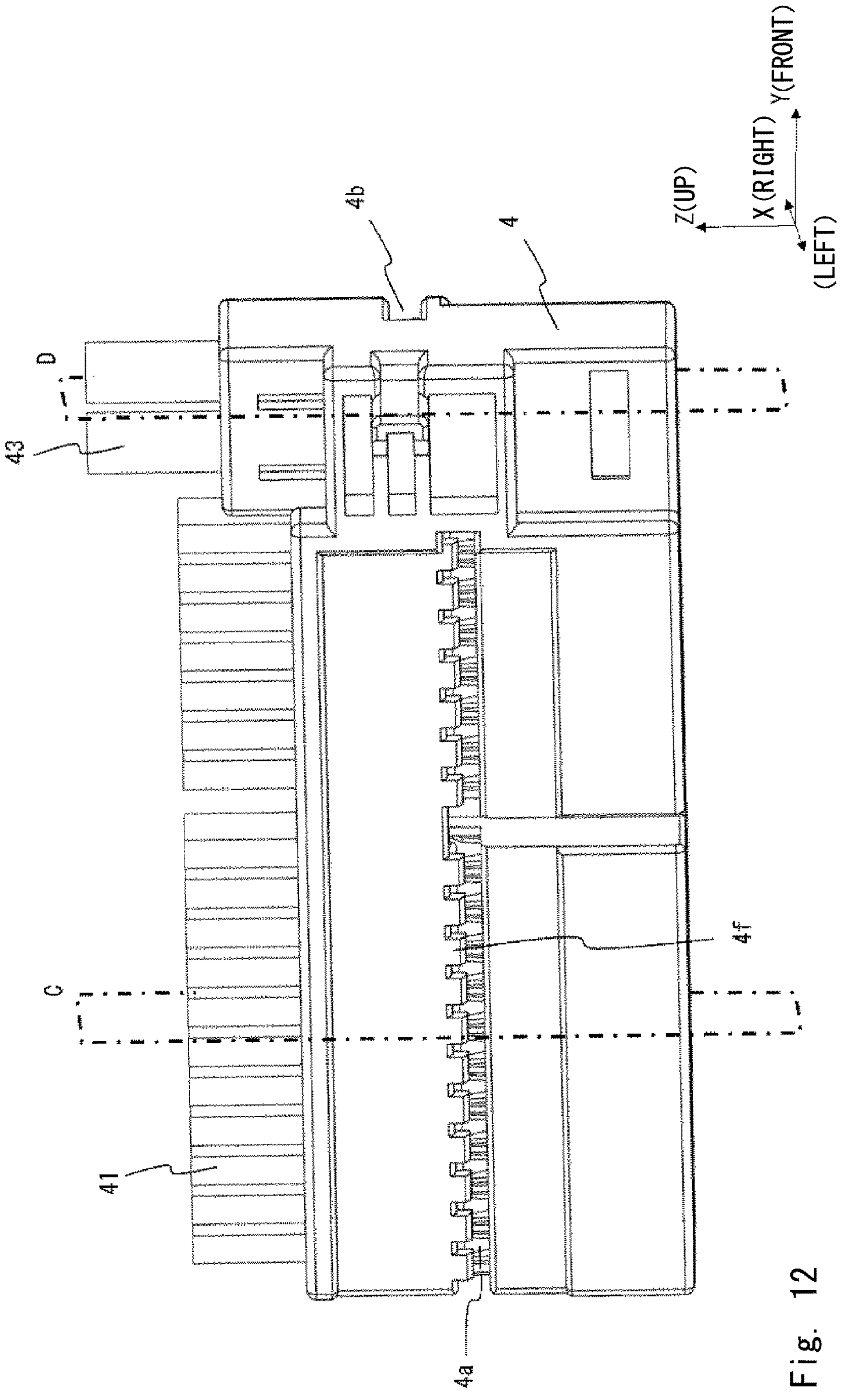
FIG. 12 is a left side view of a second internal housing.
Figure 15:
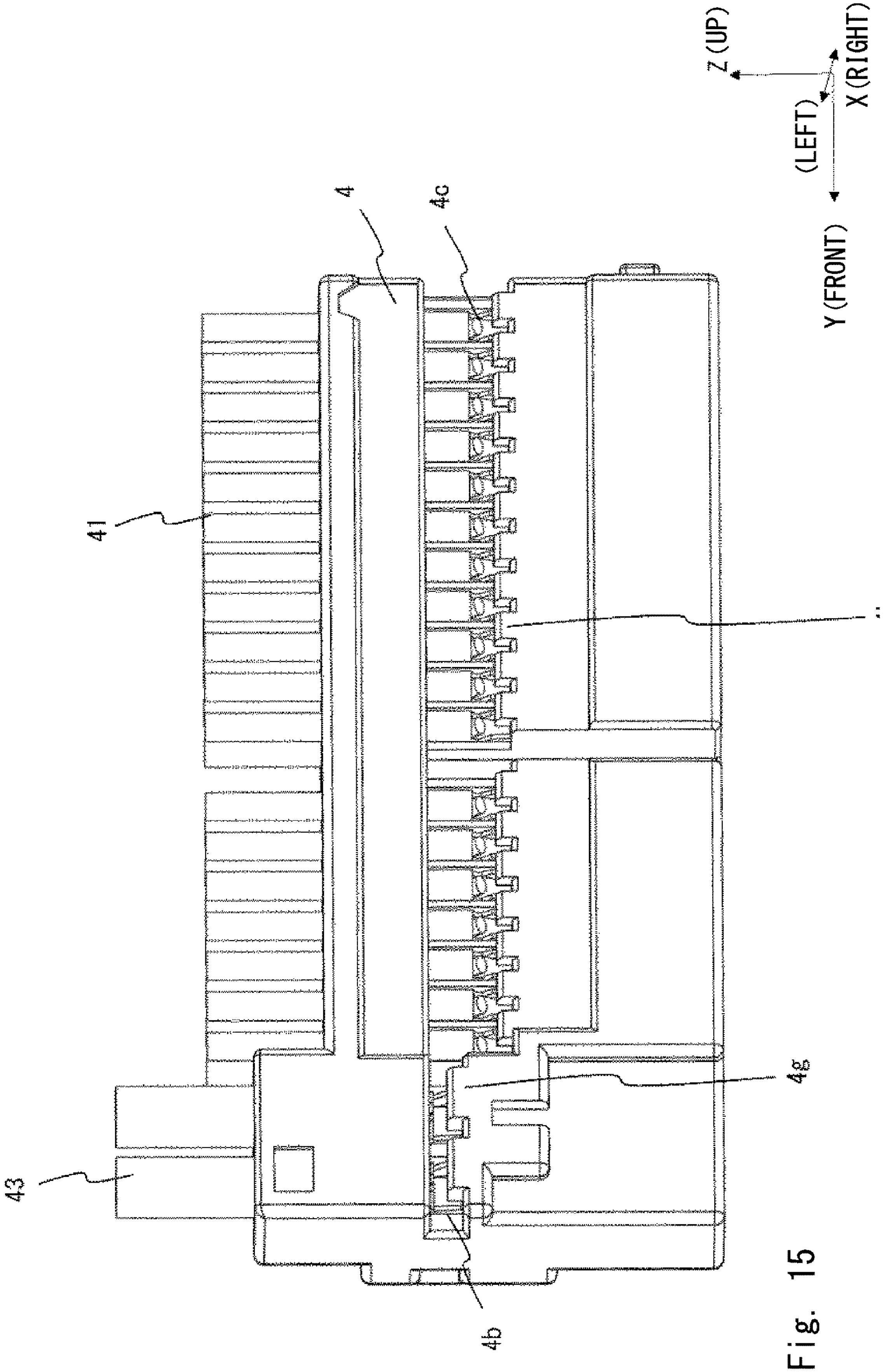
FIG. 15 is a right side view of the second internal housing.

As shown in FIG. 12, in the groove part 4*a*, a projecting part 4*f* projecting downward from the upper surface of the groove part 4*a* extends in the Y direction. Further, as shown in FIG. 15, in the groove part 4*b*, a projecting part 4*g* projecting upward from the lower surface of the groove part 4*b* is formed. In the groove part 4*c*, a projecting part 4*h* projecting upward from the lower surface of the groove part 4*c* is formed.

The projecting parts 4*f*, 4*h*, and 4*g* may have slits at predetermined intervals in the Y direction.

FIG. 19 is a view showing a part of the X-Z cross section on the back side in the Y direction of the second internal housing 4 and the external housing 2, and FIG. 20 is a view showing a part of the X-Z cross section on the front side in the Y direction of the second internal housing 4 and the external housing 2.

As shown in FIG. 19, the left retainer 34 is inserted into the groove part 4*a* in the state where a right side surface 4*i* of the projecting part 4*f* is opposed to a left side surface 34*e* of the vertical part 34*b* of the left retainer 34.

Thus, when a force in the direction of bringing the right side surface 4*i* of the projecting part 4*f* into contact with the left side surface 34*e* of the vertical part 34*b* is applied, the right side surface 4*i* of the projecting part 4*f* acts as a hook to receive the left side surface 34*e* of the vertical part 34*b*.

As shown in FIG. 19, the projecting part 4*f* does not physically interfere with the left retainer 34 when the second internal housing 4 is accommodated into the second cavity 12. Thus, the projecting part 4*f* does not inhibit the accommodation of the second internal housing 4 into the second cavity 12.

Further, as shown in FIG. 15, in the groove part 4*b*, the projecting part 4*g* projecting upward from the lower surface of the groove part 4*b* is formed. In the groove part 4*c*, the projecting part 4*h* projecting upward from the lower surface of the groove part 4*c* is formed.

As shown in FIGS. 19 and 20, the projecting part 4*g* does not physically interfere with the upper right retainer 35 when the second internal housing 4 is accommodated into the second cavity 12. Further, the projecting part 4*h* does not physically interfere with the lower right retainer 36.

In this manner, the groove part 4*a* having the projecting part 4*f* has a shape that is complementary to that of the left retainer 34 of the second cavity 12, which is the corresponding cavity. Further, the groove part 4*b* having the projecting part 4*g* and the groove part 4*c* having the projecting part 4*h* have shapes that are complementary to those of the upper right retainer 35 and the lower right retainer 36 of the second cavity 12.

Note that, as shown in FIGS. 19 and 20, a left side surface 4*j* of the projecting part 4*g* is opposed to a right side surface 35*e* of the vertical part 35*b* of the upper right retainer 35. When the left side surface 4*j* of the projecting part 4*g* comes into contact with the right side surface 35*e* of the vertical part 35*b*, the left side surface 4*j* of the projecting part 4*g* acts as a hook to receive the right side surface 35*e* of the vertical part 35*b*. Likewise, a left side surface 4*k* of the projecting part 4*h* is opposed to a right side surface 36*e* of the vertical part 36*b* of the lower right retainer 36. When the left side surface 4*k* of the projecting part 4*h* comes into contact with the right side surface 36*e* of the vertical part 36*b*, the left side surface 4*k* of the projecting part 4*h* acts as a hook to receive the right side surface 36*e* of the vertical part 36*b*.

The same applies to the third internal housing 5 to be inserted into the third cavity 13.

Figure 13:
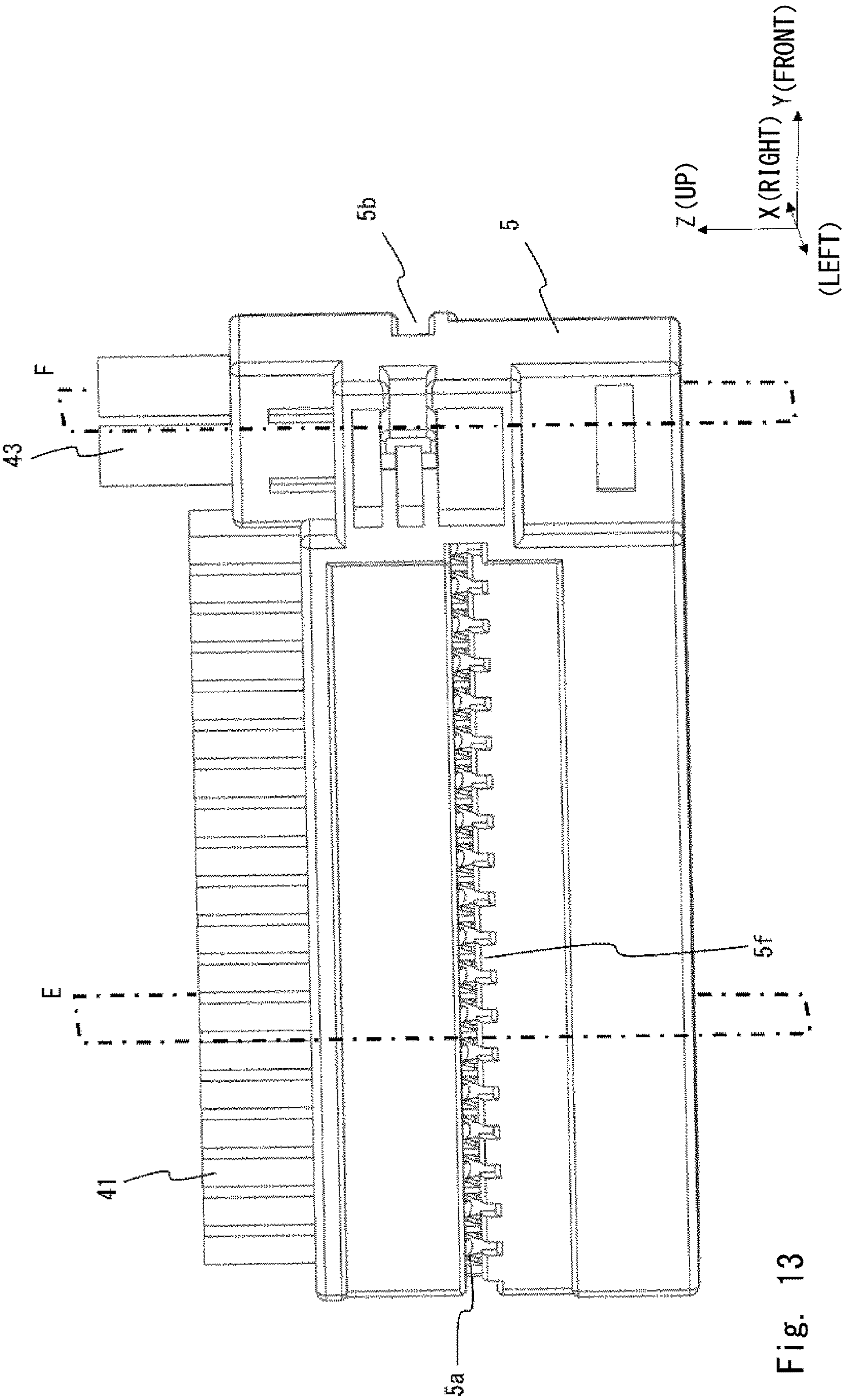
FIG. 13 is a left side view of a third internal housing.
Figure 16:
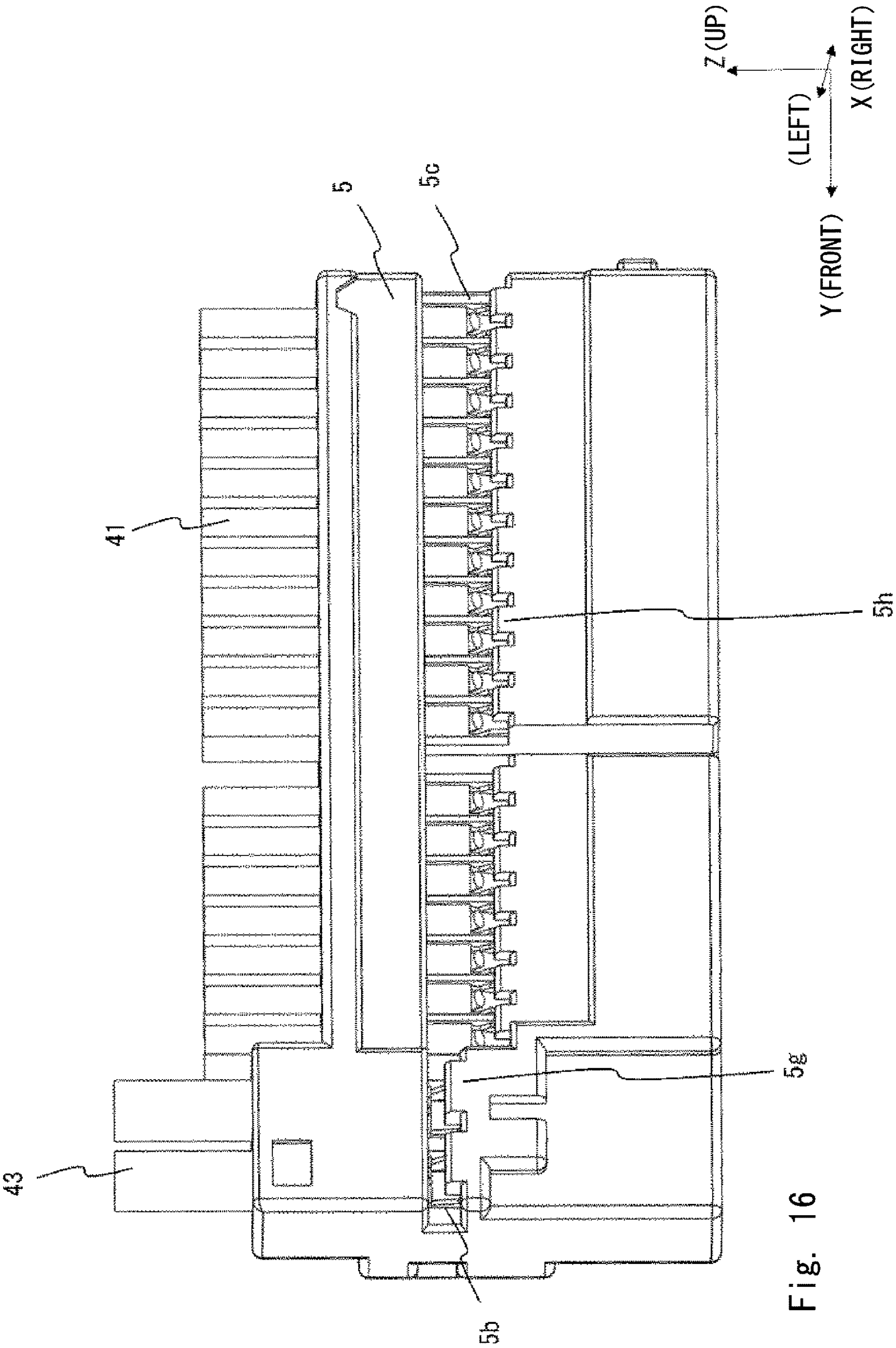
FIG. 16 is a right side view of the third internal housing.

As shown in FIG. 13, in the groove part 5*a*, a projecting part 5*f* that projects upward from the lower surface of the groove part 5*a* extends in the Y direction. Further, as shown in FIG. 16, in the groove part 5*b*, a projecting part 5*g* that projects upward from the lower surface of the groove part 5*b* is formed. In the groove part 5*c*, a projecting part 5*h* projecting upward from the lower surface of the groove part 5*c* is formed.

The projecting parts 5*f*, 5*h*, and 5*g* may have slits at predetermined intervals in the Y direction.

FIG. 21 is a view showing a part of the X-Z cross section on the back side in the Y direction of the third internal housing 5 and the external housing 2, and FIG. 22 is a view showing a part of the X-Z cross section near the front side in the Y direction of the third internal housing 5 and the external housing 2.

As shown in FIG. 21, the horizontal part 37*a* is disposed above the projecting part 5*f*, and a right side surface 5*i* of the projecting part 5*f* is opposed to a left side surface 37*e* of the vertical part 37*b* of the left retainer 37. Thus, when a force in the direction of bringing the right side surface 5*i* of the projecting part 5*f* into contact with the left side surface 37*e* of the vertical part 37*b* is applied, the right side surface 5*i* of the projecting part 5*f* acts as a hook to receive the left side surface 37*e* of the vertical part 37*b*.

As shown in FIG. 21, the projecting part 5*f* does not physically interfere with the left retainer 37 when the third internal housing 5 is accommodated into the third cavity 13. Thus, the projecting part 5*f* does not inhibit the accommodation of the third internal housing 5 into the third cavity 13.

Further, as shown in FIG. 16, in the groove part 5*b*, the projecting part 5*g* projecting upward from the lower surface of the groove part 5*b* is formed. As shown in FIG. 16, in the groove part 5*c*, the projecting part 5*h* projecting upward from the lower surface of the groove part 5*c* is formed.

As shown in FIGS. 21 and 22, the projecting part 5*g* does not physically interfere with the upper right retainer 38 when the third internal housing 5 is accommodated into the third cavity 13. Further, the projecting part 5*h* does not physically interfere with the lower right retainer 39.

In this manner, the groove part 5*a* having the projecting part 5*f* has a shape that is complementary to that of the left retainer 37 of the third cavity 13, which is the corresponding cavity. Further, the groove part 5*b* having the projecting part 5*g* and the groove part 5*c* having the projecting part 5*h* have shapes that are complementary to those of the upper right retainer 38 and the lower right retainer 39 of the third cavity 13.

Note that, as shown in FIGS. 21 and 22, a left side surface 5*j* of the projecting part 5*g* is opposed to a right side surface 38*e* of the vertical part 38*b* of the upper right retainer 38. When the left side surface 5*j* of the projecting part 5*g* comes into contact with the right side surface 38*e* of the vertical part 38*b*, the left side surface 5*j* of the projecting part 5*g* acts as a hook to receive the right side surface 38*e* of the vertical part 38*b*. Likewise, a left side surface 5*k* of the projecting part 5*h* is opposed to a right side surface 39*e* of the vertical part 39*b* of the lower right retainer 39. When the left side surface 5*k* of the projecting part 5*h* comes into contact with the right side surface 39*e* of the vertical part 39*b*, the left side surface 5*k* of the projecting part 5*h* acts as a hook to receive the right side surface 39*e* of the vertical part 39*b*.

The case where the internal housing 3, 4, or 5 is wrongly inserted into a cavity different from the target cavity is described hereinafter with reference to FIGS. 23 to 28. FIGS. 23 to 28 are views showing the cross section of the external housing 2 on the back side and the cross section of each of the internal housings 3, 4, and 5 in an overlapping manner.

Figure 23:
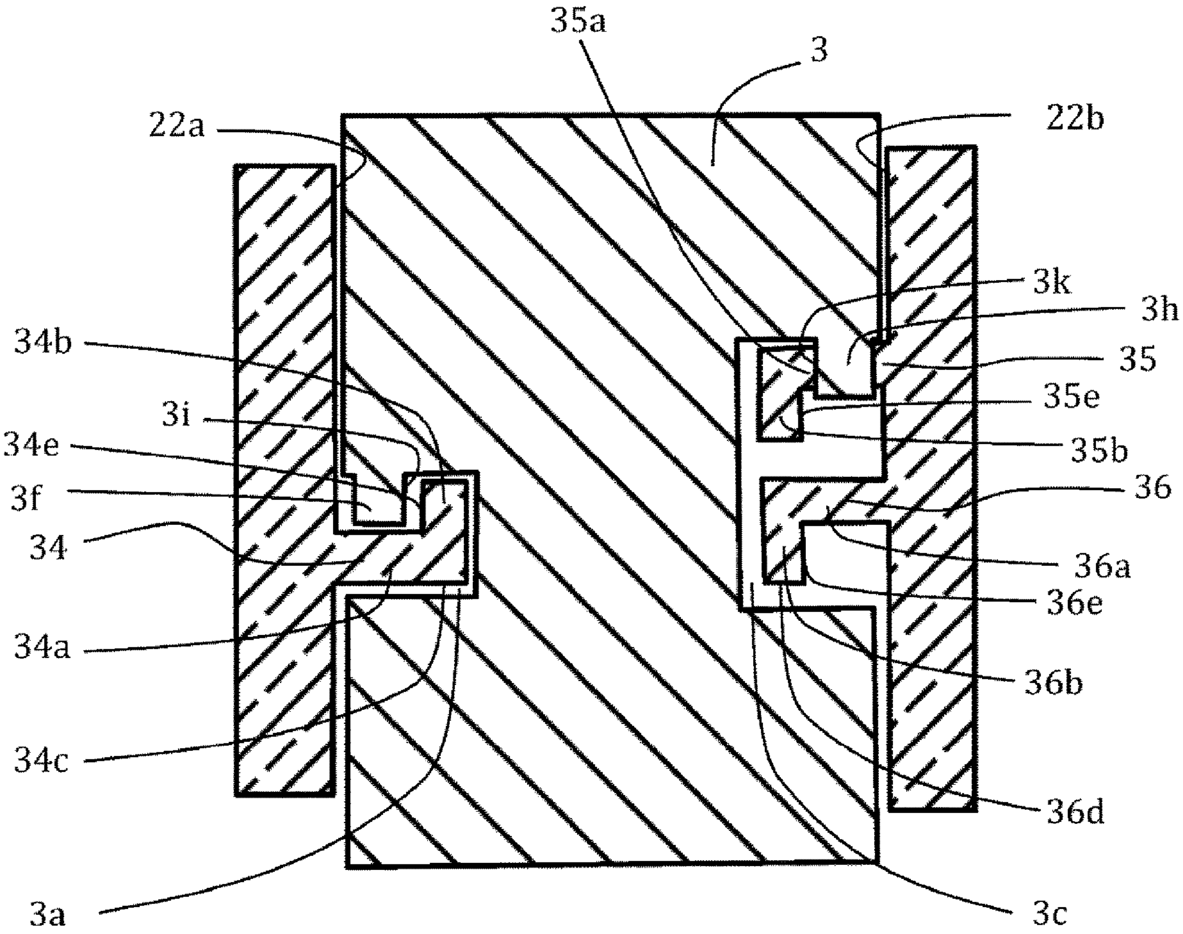
FIG. 23 is a view showing the case where the first internal housing is about to be inserted into the second cavity.

As shown in FIG. 23, when the first internal housing 3 is about to be inserted into the second cavity 12, the projecting part 3*h* in the groove part 3*c* physically interferes with the horizontal part 35*a* of the upper right retainer 35. This prevents wrong insertion of the first internal housing 3 into the second cavity 12.

Figure 24:
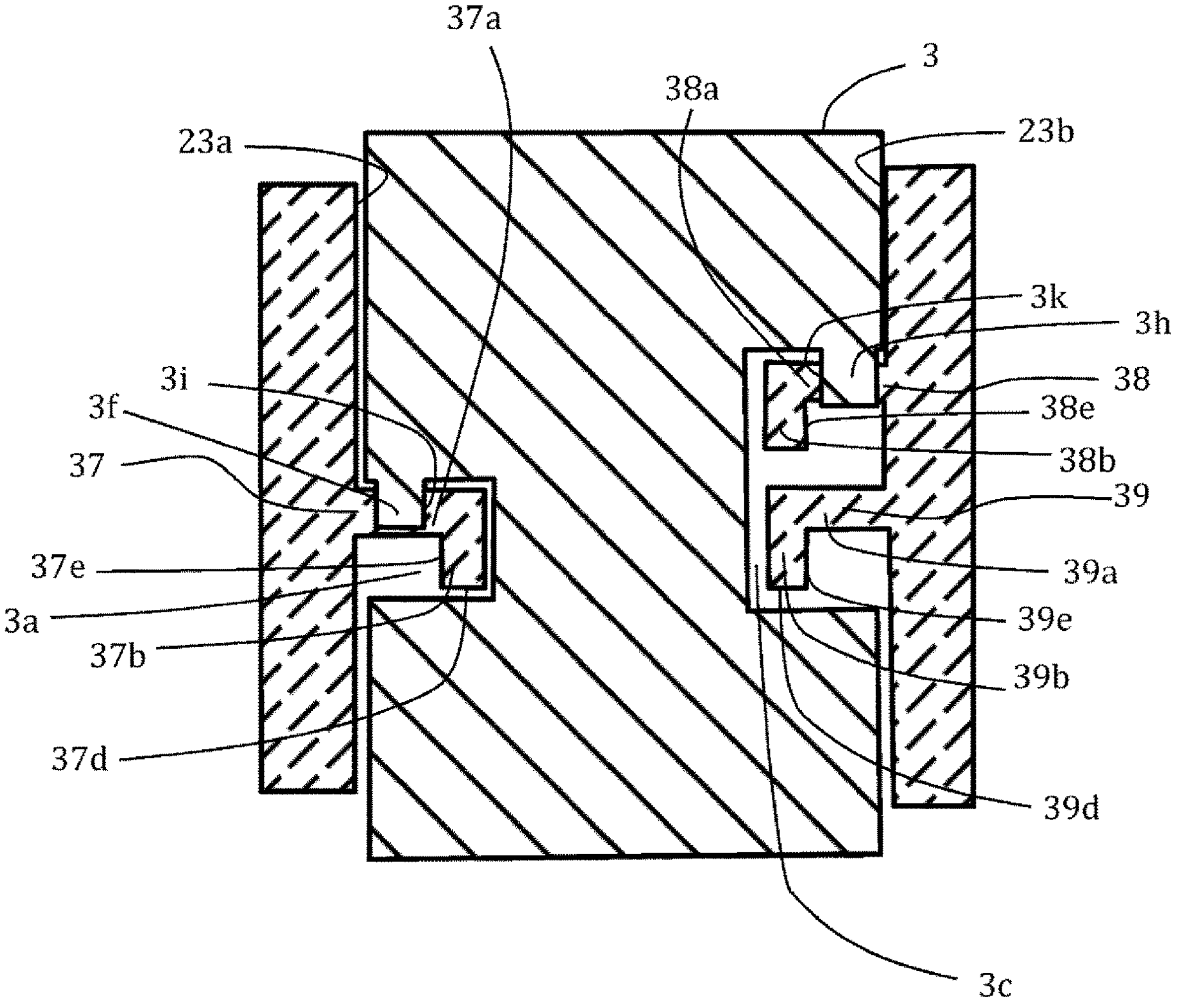
FIG. 24 is a view showing the case where the first internal housing is about to be inserted into the third cavity.

As shown in FIG. 24, when the first internal housing 3 is about to be inserted into the third cavity 13, the projecting part 3*f* physically interferes with the horizontal part 37*a* of the left retainer 37. At the same time, the projecting part 3*h* physically interferes with the horizontal part 38*a* of the upper right retainer 38. This prevents wrong insertion of the first internal housing 3 into the third cavity 13.

Figure 25:
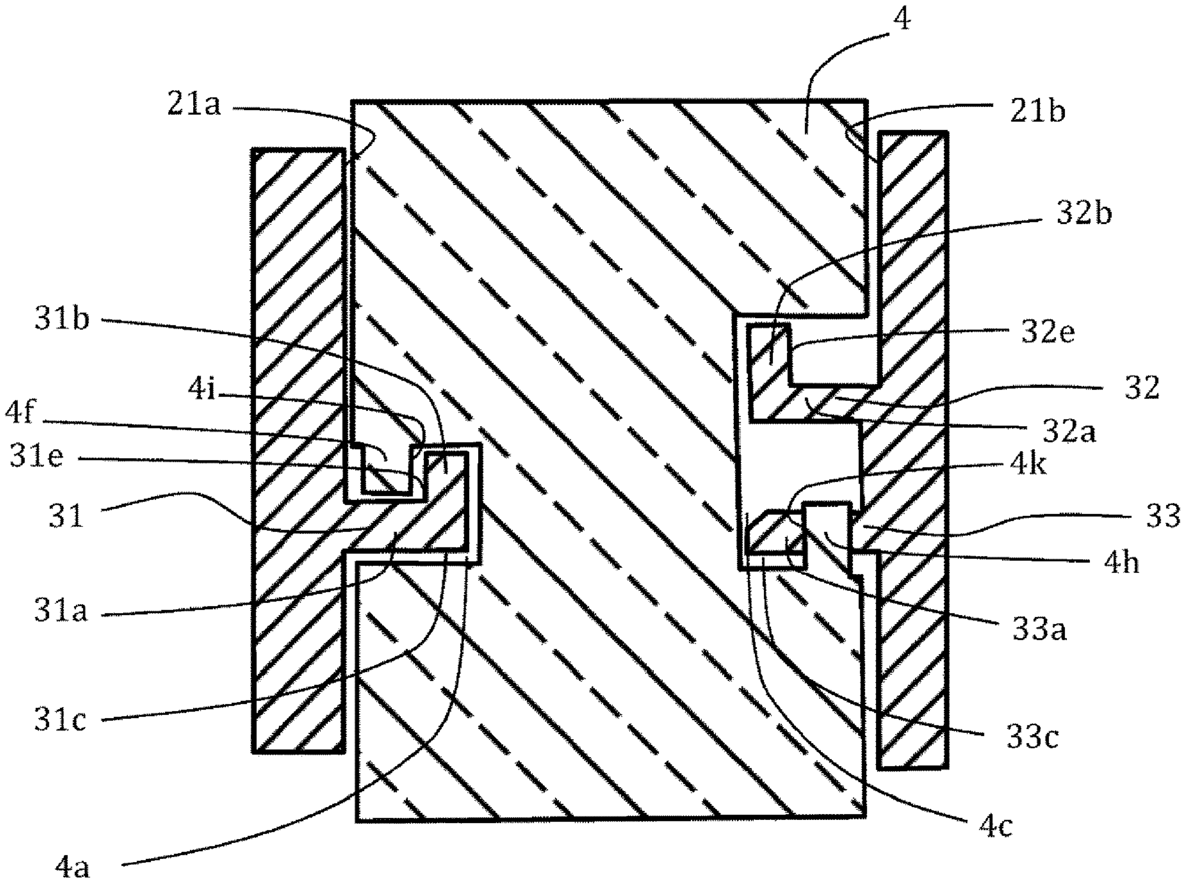
FIG. 25 is a view showing the case where the second internal housing is about to be inserted into the first cavity.

As shown in FIG. 25, when the second internal housing 4 is about to be inserted into the first cavity 11, the projecting part 4*h* in the groove part 4*c* physically interferes with the horizontal part 33*a* of the lower right retainer 33.

In this case, since the projecting part 4*g* is on the front side relative to the projecting part 4*h*, the projecting part 4*h* physically interferes with the horizontal part 33*a* of the lower right retainer 33 before the projecting part 4*g* physically interferes with the horizontal part 32*a* of the upper right retainer 32. This prevents wrong insertion of the second internal housing 4 into the first cavity 11.

Figure 26:
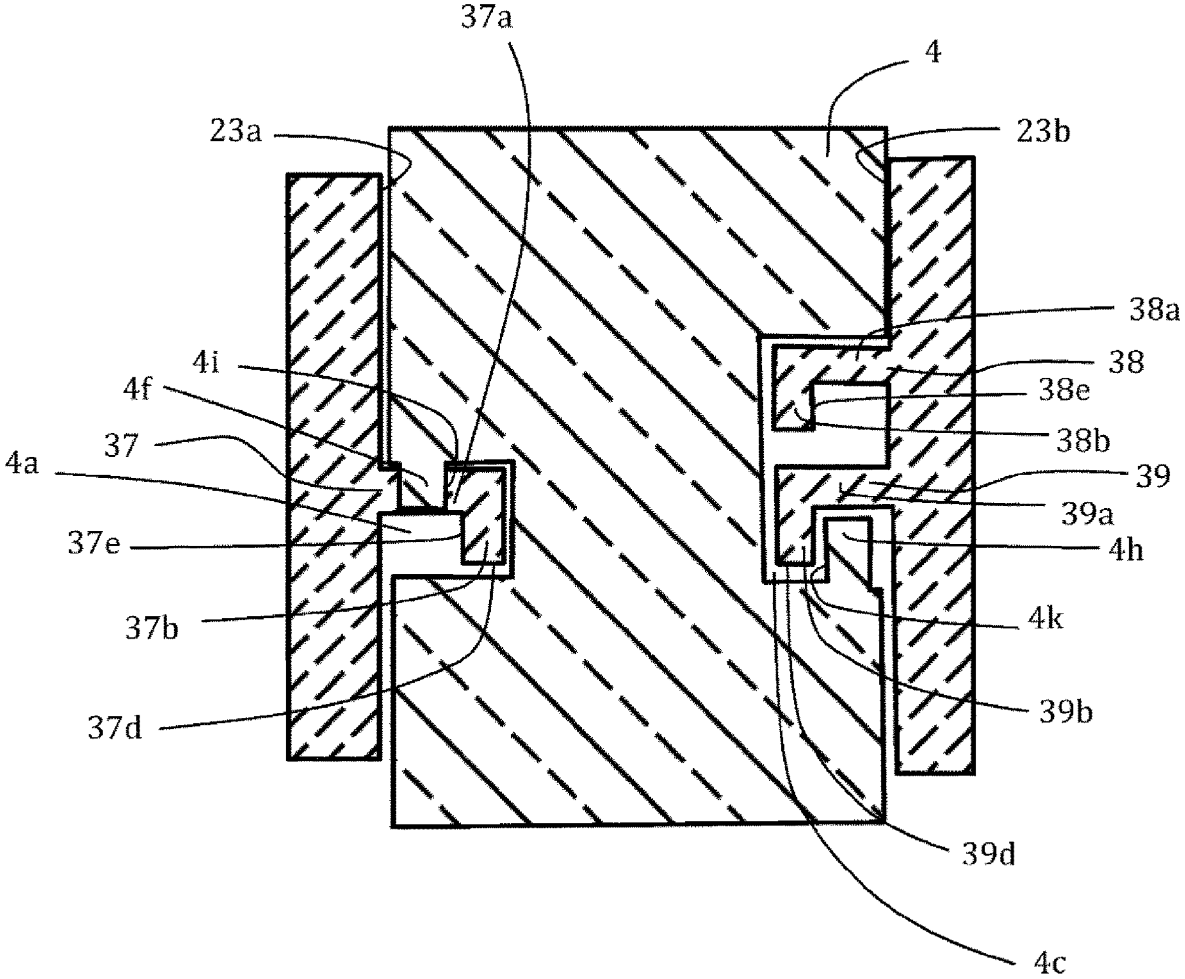
FIG. 26 is a view showing the case where the second internal housing is about to be inserted into the third cavity.

As shown in FIG. 26, when the second internal housing 4 is about to be inserted into the third cavity 13, the projecting part 4*f* in the groove part 4*a* physically interferes with the horizontal part 37*a* of the left retainer 37. This prevents wrong insertion of the second internal housing 4 into the third cavity 13.

Figure 27:
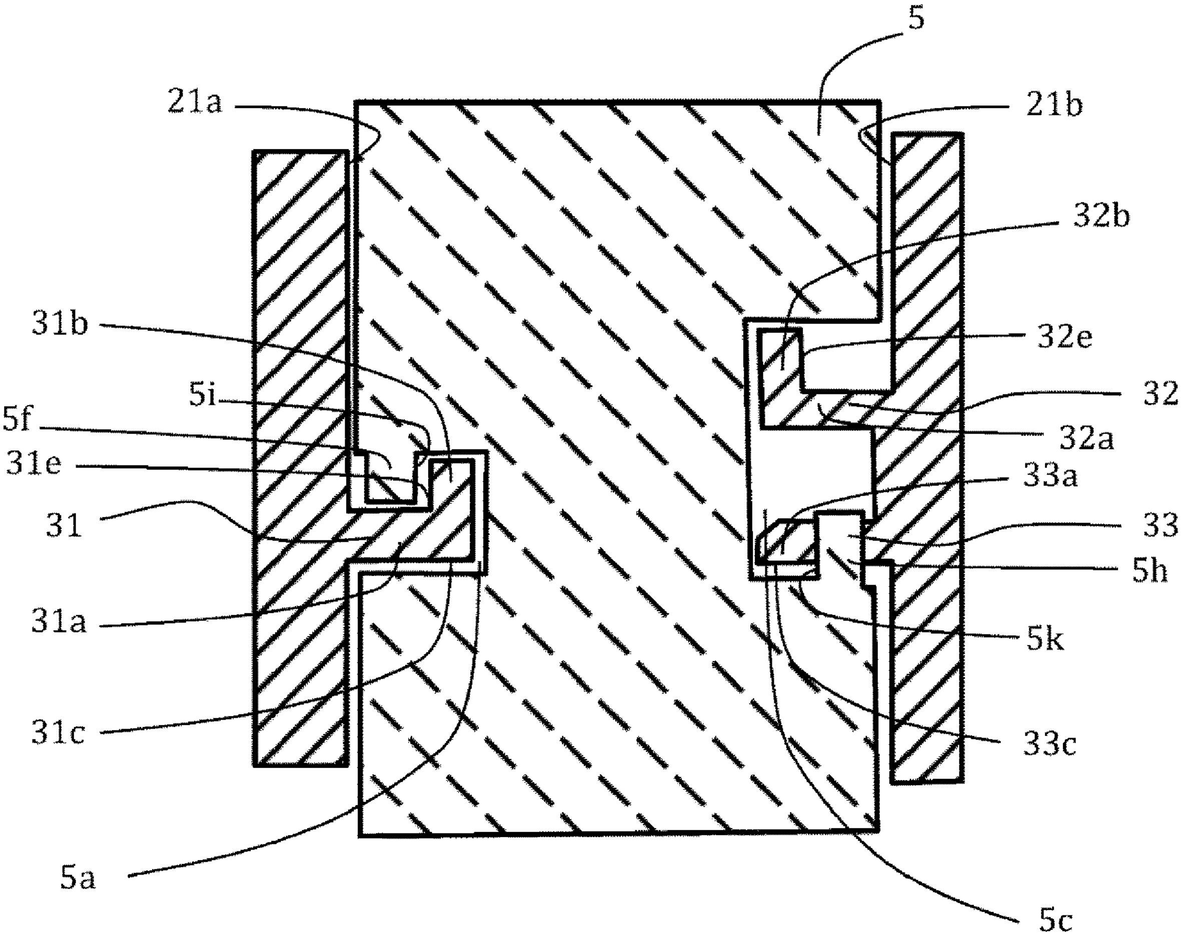
FIG. 27 is a view showing the case where the third internal housing is about to be inserted into the first cavity.
Figure 28:
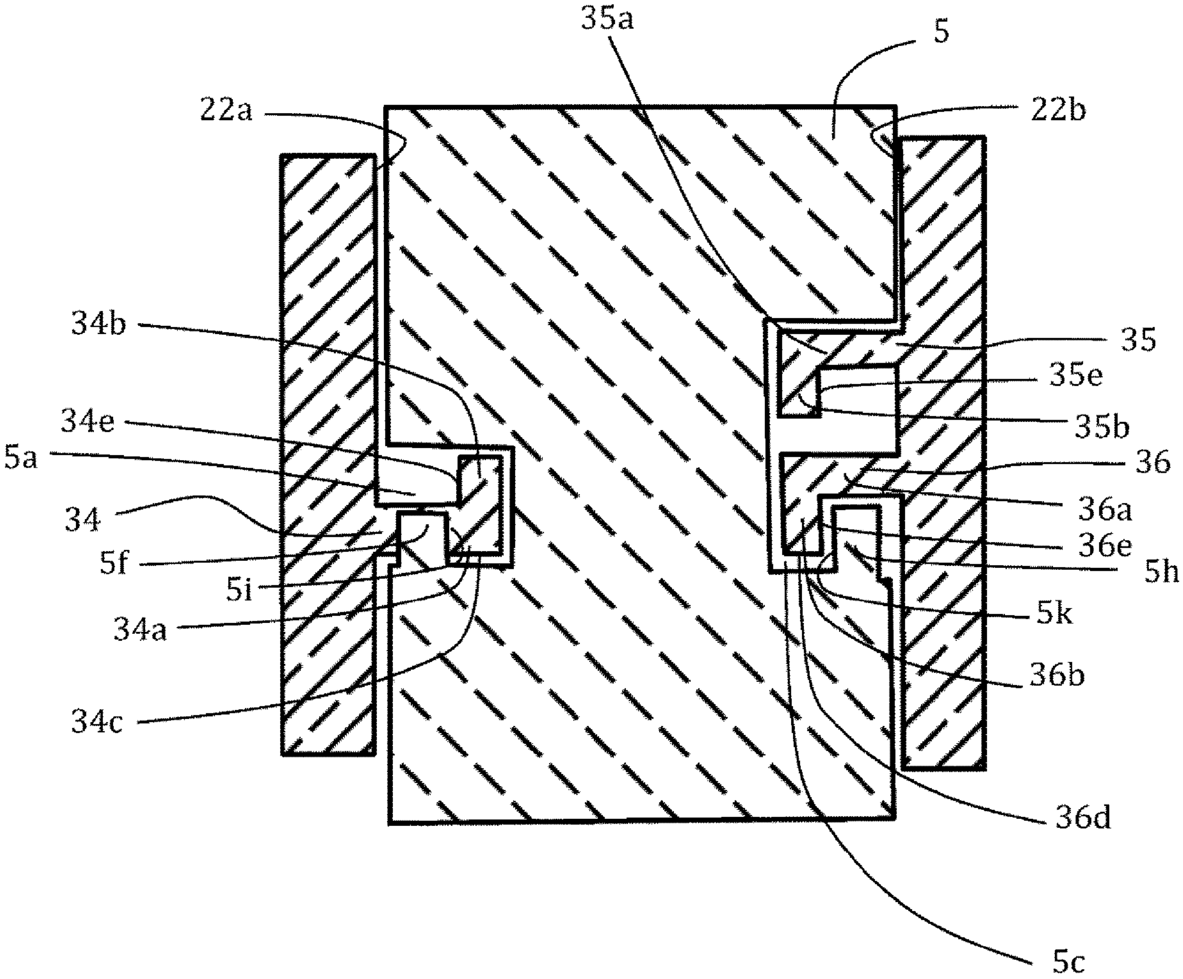
FIG. 28 is a view showing the case where the third internal housing is about to be inserted into the second cavity.

As shown in FIG. 27, when the third internal housing 5 is about to be inserted into the first cavity 11, the projecting part 5*h* in the groove part 5*c* physically interferes with the horizontal part 33*a* of the lower right retainer 33. In this case, since the projecting part 5*g* is on the front side relative to the projecting part 5*h*, the projecting part 5*h* physically interferes with the horizontal part 33*a* of the lower right retainer 33 before the projecting part 5*g* physically interferes with the horizontal part 32*a* of the upper right retainer 32. This prevents wrong insertion of the third internal housing 5 into the first cavity 11. As shown in FIG. 28, when the third internal housing 5 is about to be inserted into the second cavity 12, the projecting part 5*f* in the groove part 5*a* physically interferes with the horizontal part 34*a* of the left retainer 34. This prevents wrong insertion of the third internal housing 5 into the second cavity 12.

Thus, the first internal housing 3 is restricted so that it can be inserted only into the first cavity 11 and cannot be inserted into the other cavities 12 and 13 by a combination of the shapes of the groove parts 3*a*, 3*b*, and 3*c* having the projecting parts 3*f*, 3*g* and 3*h* and the shapes of the retainers 31, 32, and 33 of the first cavity 11.

Likewise, the second internal housing 4 is restricted so that it can be inserted only into the second cavity 12 and cannot be inserted into the other cavities 11 and 13 by a combination of the shapes of the groove parts 4*a*, 4*b*, and 4*c* having the projecting parts 4*f*, 4*g*, and 4*h* and the shapes of the retainers 34, 35, and 36 of the second cavity 12.

Likewise, the third internal housing 5 is restricted so that it can be inserted only into the third cavity 13 and cannot be inserted into the other cavities 11 and 12 by a combination of the shapes of the groove parts 5*a*, 5*b*, and 5*c* having the projecting parts 5*f*, 5*g*, and 5*h* and the shapes of the retainers 37, 38, and 39 of the third cavity 13.

In this manner, insertion into a cavity is allowed only when the shapes of all groove parts in the internal housing and the shapes of all projecting parts in the external housing 2 completely match.

Stated differently, an objective of preventing wrong insertion of the internal housing into the external housing 2 is achieved when the shapes of some groove parts and the shapes of some projecting parts match but not all of the shapes match and there is a mismatch part.

Note that an objective of preventing wrong insertion into the external housing 2 is achieved as a matter of course when the shapes of all groove parts and the shapes of all projecting parts do not match.

A plurality of holes that vertically penetrate the first internal housing 3 and terminals to be inserted into the holes are described hereinafter with reference to FIGS. 3 to 5 and FIGS. 29 and 30.

As shown in FIGS. 3 to 5, the first internal housing 3 has two types of holes that vertically penetrate the first internal housing 3 in the Z direction. The two types of holes are first holes 3*d* and second holes 3*e*.

The first holes 3*d* are formed on the back side in the Y direction relative to the second holes 3*e*. Typically, as shown in FIGS. 3 to 5, the first holes 3*d* are in two rows in the X direction, and a plurality of first holes 3*d* are aligned in the Y direction.

In each of the first holes 3*d*, a first terminal 42 that is crimped onto the distal end of the first wire 41 is inserted from above.

Figure 29:
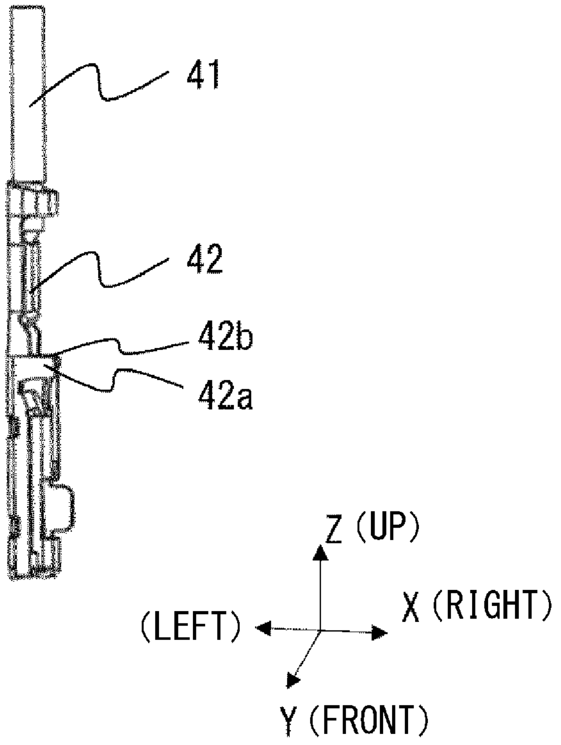
FIG. 29 is a view showing a first terminal that is crimped onto a first wire.

FIG. 29 is an example of the first wire 41 and the first terminal 42 that is crimped onto the first wire 41. Typically, the first wire 41 is a wire that is used for signal transmission. In this example, each of the first wire 41 and the first terminal 42 has a shape extending in the Z direction.

The first terminal 42 includes a first latching part 42*a* that is formed to project from its side surface in a direction orthogonal to the direction along which the terminal extends.

Figure 31:
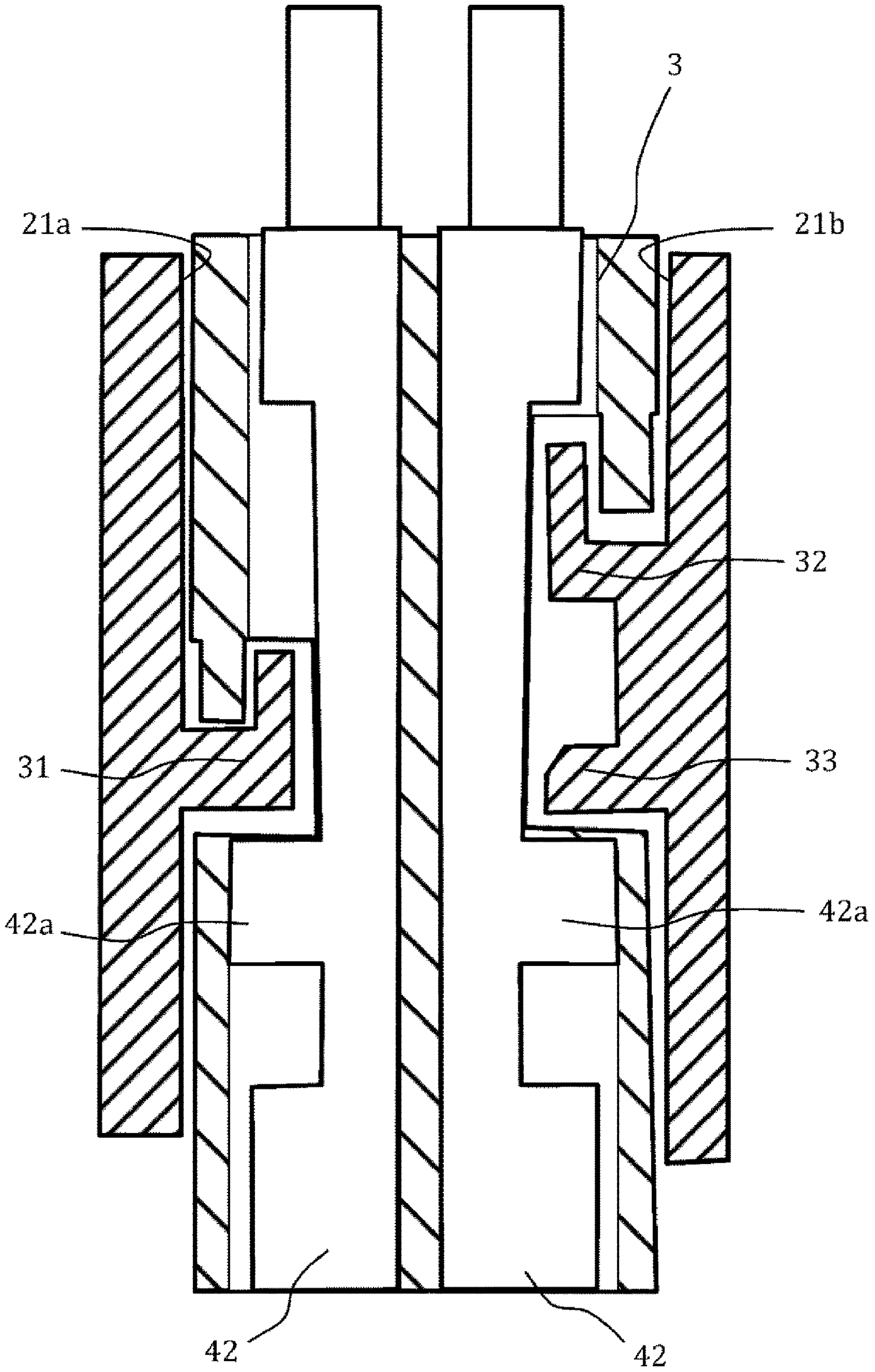
FIG. 31 is a view showing the state where the first internal housing into which the first terminal is inserted is inserted into the external housing.

FIG. 31 is a view showing the state where the first internal housing 3 into which the first terminal 42 is inserted is accommodated in the external housing 2.

The first latching part 42*a* projects leftward from the first terminal 42 when viewed from the front in the case where the first terminal 42 is inserted into the left row of the first hole 3*d* consisting of two rows in the first internal housing 3. On the other hand, the first latching part 42*a* projects rightward from the first terminal 42 when viewed from the front in the case where the first terminal 42 is inserted into the right row of the first hole 3*d* consisting of two rows in the first internal housing 3.

As shown in FIG. 31, when the first internal housing 3 is accommodated in the first cavity 11, the position of the first latching part 42*a* when the first terminal 42 is inserted into the first hole 3*d* is below the left retainer 31 and the lower right retainer 33.

The plurality of first terminals 42 are aligned along the Y direction in each of the right row and the left row. Thus, the left retainer 31 or the lower right retainer 33 is inserted above the first latching part 42*a* in each of the first terminals 42 in the same manner.

Figure 32:
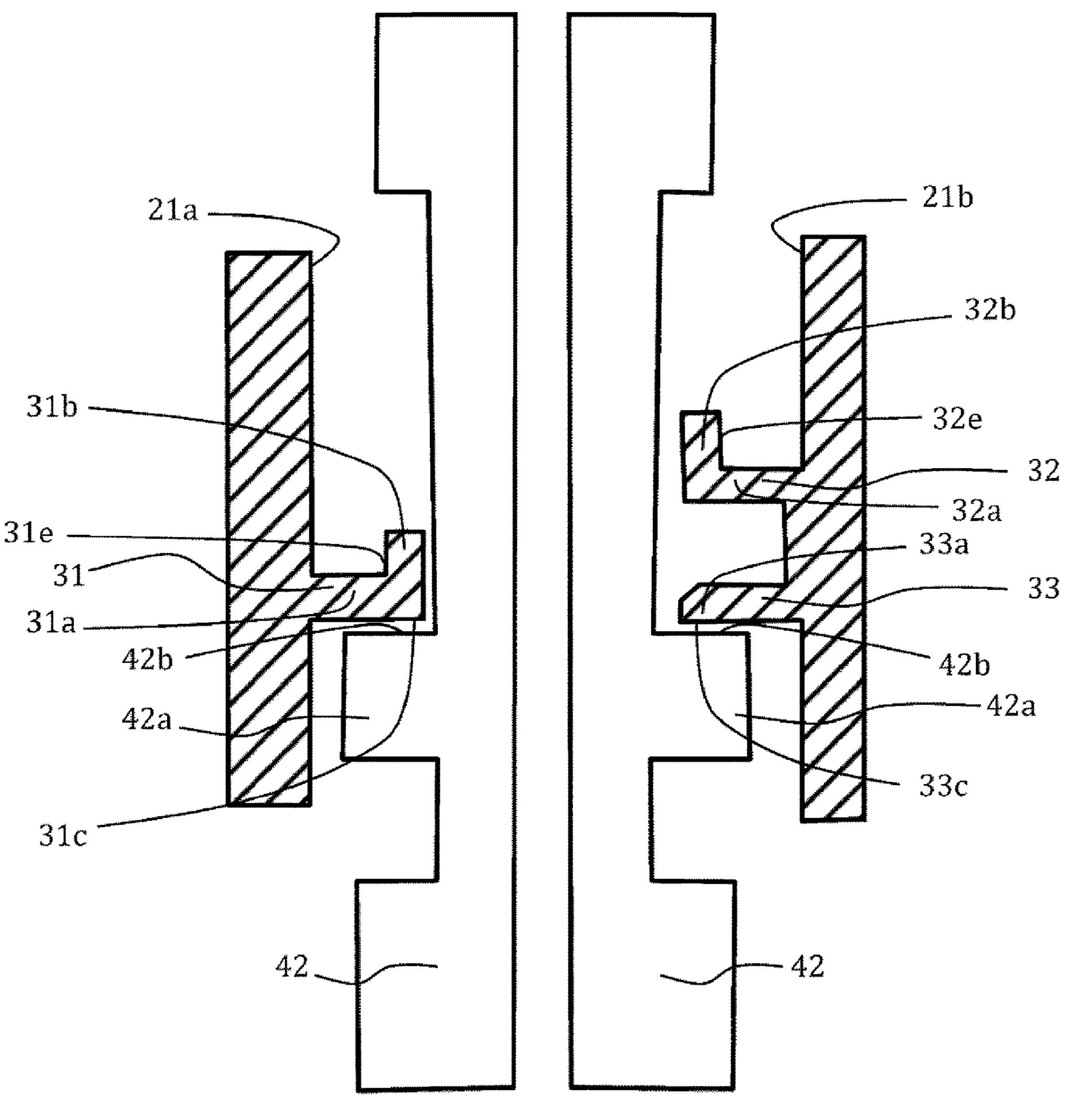
FIG. 32 is a view showing the first terminal inserted into the first internal housing and the retainers of the external housing.

FIG. 32 is a view showing an example of the positional relationship between the first terminal 42 and the external housing 2 when the first internal housing 3 is accommodated in the first cavity 11, where the illustration of the first internal housing is omitted for easier understanding.

As shown in FIG. 32, in the first terminal 42 disposed in the left row in the first internal housing 3, an upper surface 42*b* of the first latching part 42*a* is opposed to an under surface 31*c* of the horizontal part 31*a* near the distal end of the horizontal part 31*a* of the retainer 31 of the external housing 2.

For example, when a force of pulling up the first terminal 42 is applied to the first terminal 42 that is inserted into the first hole 3*d* in the left row, the upper surface 42*b* of the first latching part 42*a* comes into contact with the under surface 31*c* of the left retainer 31. The first terminal 42 is thereby secondarily locked by the external housing 2, which prevents the first terminal 42 from being pulled out of the first hole 3*d*.

Likewise, when a force of pulling up the first terminal 42 is applied to the first terminal 42 that is inserted into the first hole 3*d* in the right row, the upper surface 42*b* of the first latching part 42*a* comes into contact with an under surface 33*c* of the lower right retainer 33 that extends inward of the first cavity 11. The first terminal 42 is thereby secondarily locked by the external housing 2, which prevents the first terminal 42 from being pulled out of the first hole 3*d*.

Note that, the first terminal 42 has a recess that is recessed in the X direction above the first latching part 42*a*, which is the upper part of the first latching part 42*a*. Specifically, in the first terminal 42, the left retainer 31, the upper right retainer 32, and the lower right retainer 33 are placed in this recess. The recess is formed by crimping the first wire 41 to the first terminal 42.

The same applies to the second internal housing 4.

Figure 33:
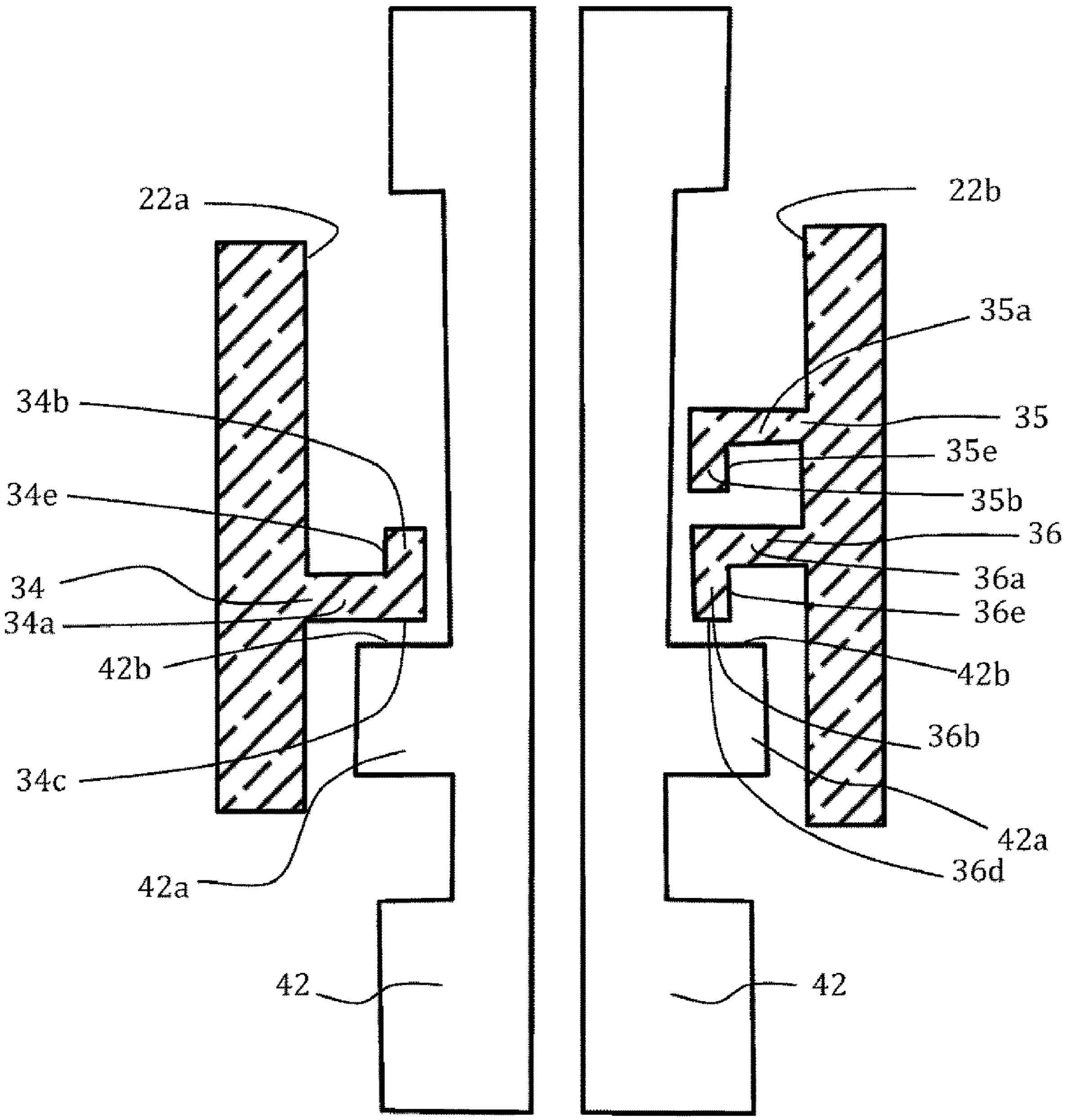
FIG. 33 is a view showing the first terminal inserted into the second internal housing and the retainers of the external housing.

In the second internal housing 4, as shown in FIG. 33, the upper surface 42*b* of the first latching part 42*a* in the first terminal 42 is vertically opposed to an under surface 36*d* of the vertical part 36*b* in the lower right retainer 36 that extends inward of the second cavity 12.

The first terminal 42 is thereby secondarily locked by the external housing 2, which prevents the first terminal 42 from being pulled out of the first hole 4*d*.

The same applies to the third internal housing 5.

Figure 34:
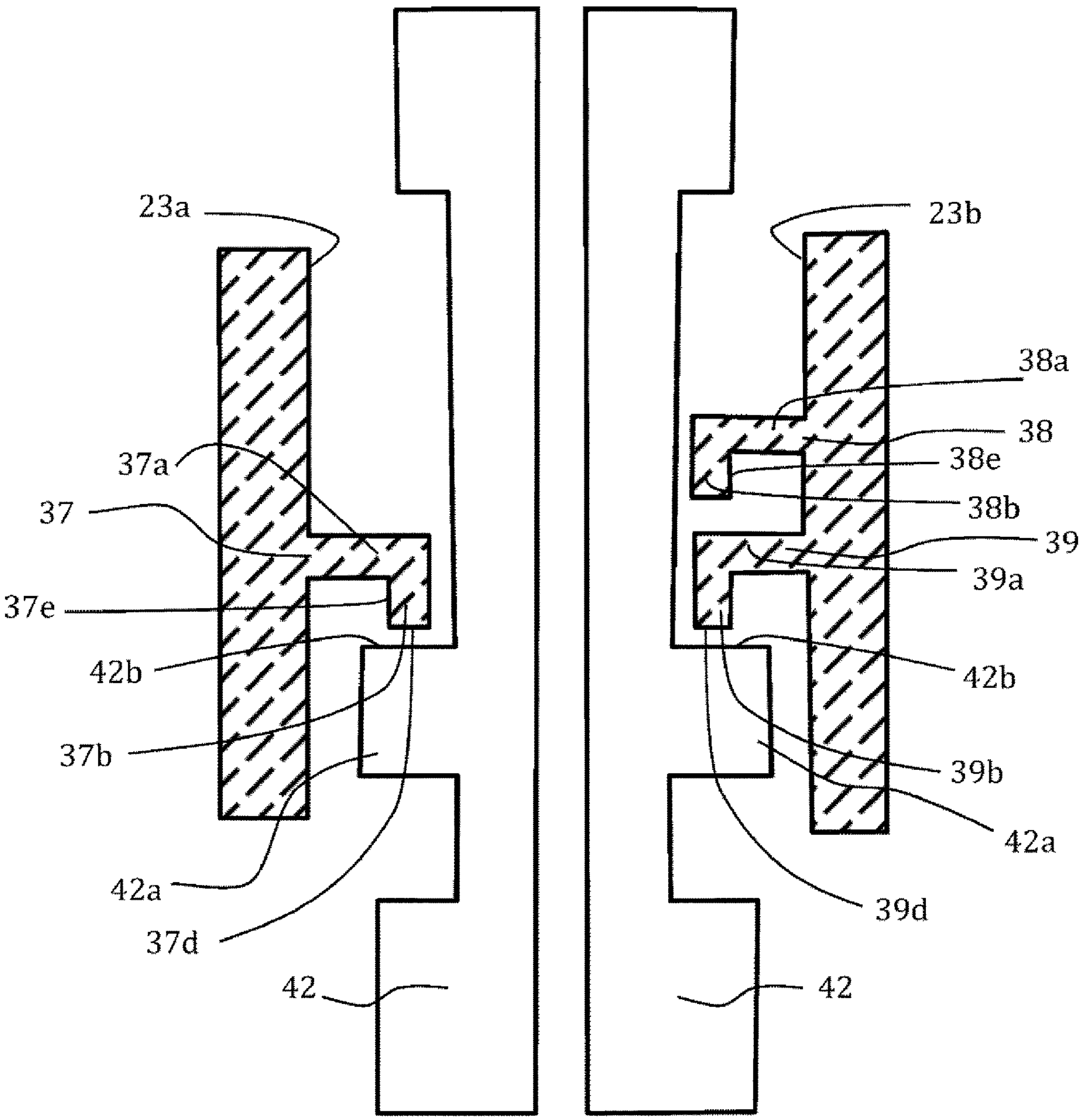
FIG. 34 is a view showing the first terminal inserted into the third internal housing and the retainers of the external housing.

In the third internal housing 5, as shown in FIG. 34, the upper surface 42*b* of the first latching part 42*a* in the first terminal 42 is vertically opposed to an under surface 37*d* of the vertical part 37*b* in the left retainer 37.

Further, in the first terminal 42 that is inserted into the first hole 3*d* in the right row, the upper surface 42*b* of the first latching part 42*a* is vertically opposed to an under surface 39*d* of the vertical part 39*b* in the lower right retainer 39.

The first terminal 42 is thereby secondarily locked by the external housing 2, which prevents the first terminal 42 from being pulled out of a first hole 5*d*.

A second wire 43 that is inserted into the second hole 3*e* is described hereinafter with reference to FIGS. 3 to 5 and FIG. 30.

As shown in FIGS. 3 to 5, the second holes 3*e* are on the front side in the Y direction relative to the first holes 3*d*. The second holes 3*e* are aligned along the Y direction.

In each of the second holes 3*e*, a second terminal 44 that is crimped onto the distal end of a second wire 43 is inserted from above.

Figure 30:
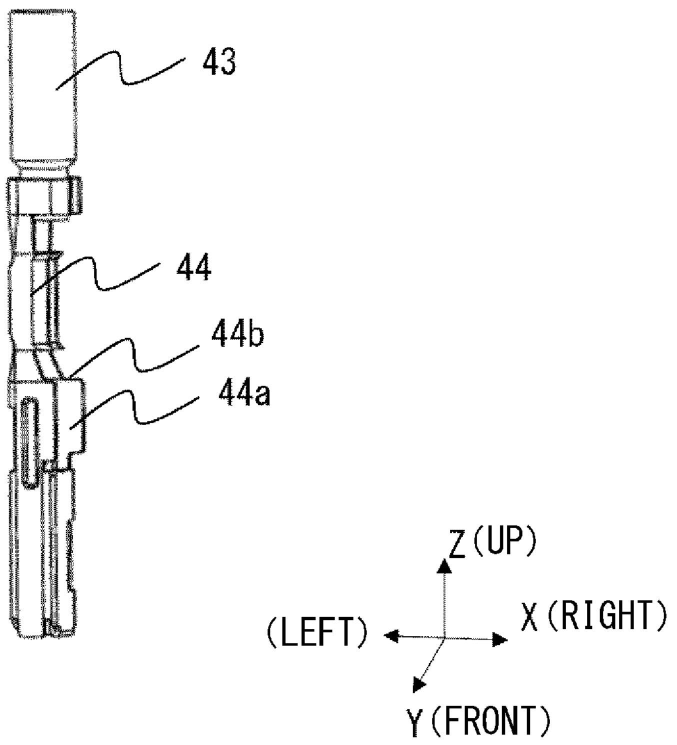
FIG. 30 is a view showing a second terminal that is crimped onto a second wire.

FIG. 30 is an example of the second terminal 44 that is crimped onto the second wire 43. Typically, the second wire 43 is a wire that is used for power supply. FIGS. 3 and 4 show the state where the two second wires 43 are aligned in the Y direction. In this example, each of the two second wires 43 and the second terminal 44 has a shape extending in the Z direction.

The second terminal 44 includes a second latching part 44*a* that is formed to project from a part of the side surface of the second terminal 44 in a direction orthogonal to the direction along which the terminal extends. When the second terminal 44 is inserted into the second hole 3*e*, the second latching part 44*a* is on the right side of the second terminal 44.

In the case where the first internal housing 3 is accommodated in the first cavity 11, the position of the second latching part 44*a* when the second terminal 44 is inserted into the second hole 3*e* is below the upper right retainer 32.

The plurality of second terminals 44 are aligned along the Y direction. Thus, the upper right retainer 32 is inserted above the second latching part 44*a* of any of the second terminals 44 in the same manner.

Figure 35:
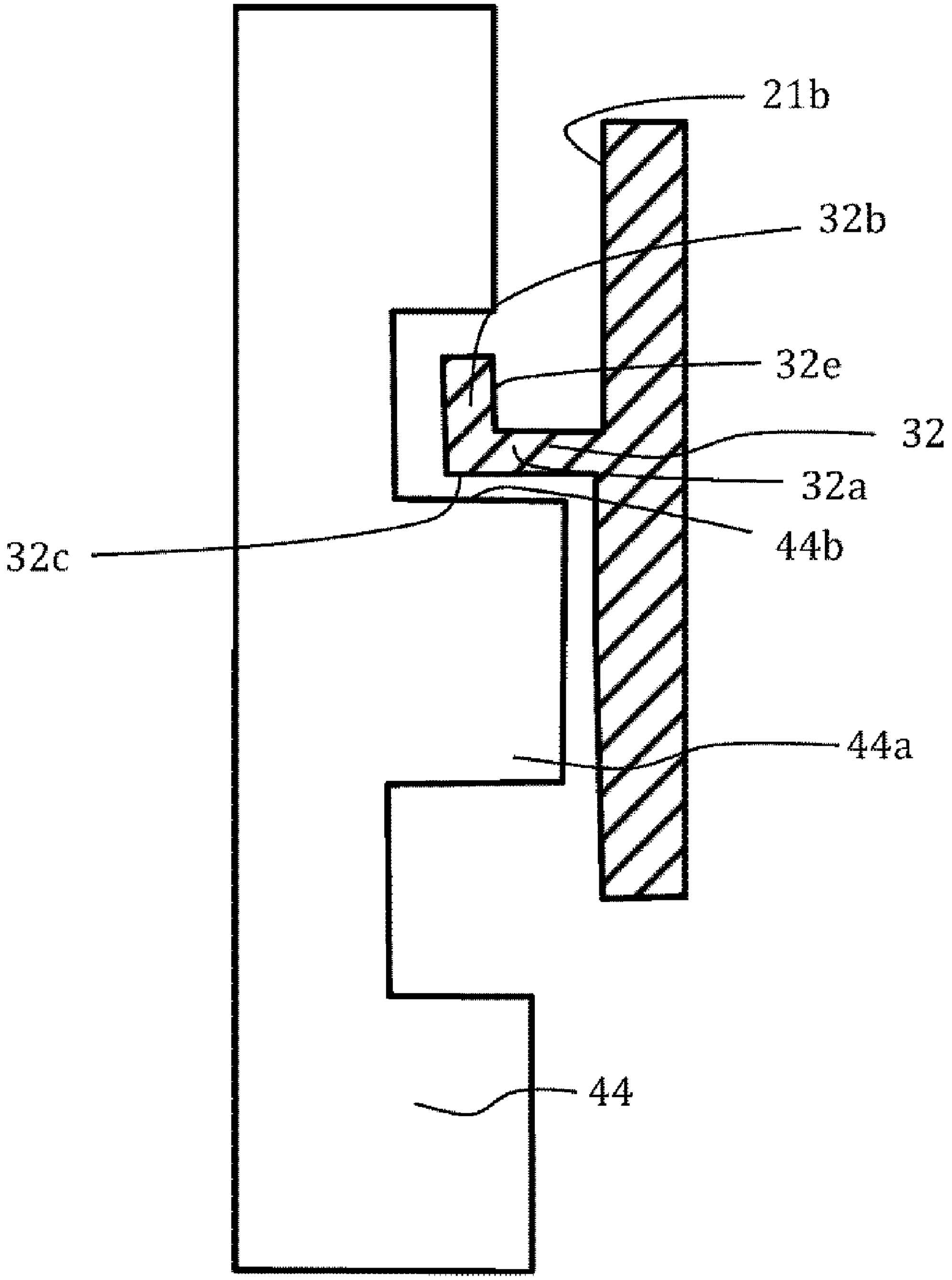
FIG. 35 is a view showing the second terminal inserted into the first internal housing and the retainers of the external housing.

FIG. 35 is an X-Z cross-sectional view showing the second terminal 44 that is inserted into the first internal housing 3. Although FIG. 35 shows the state where the first internal housing 3 is accommodated in the external housing 2, the illustration of the first internal housing 3 is omitted for better understanding, and only the right side wall surface 21*b* is shown in the external housing 2.

As shown in FIG. 35, in the first internal housing 3, an upper surface 44*b* of the second latching part 44*a* in the second terminals 44 is opposed to an under surface 32*c* of the horizontal part 32*a* near the distal end of the horizontal part 32*a* of the upper right retainer 32.

For example, when a force of pulling up the second terminal 44 is applied to the second terminal 44, the upper surface 44*b* of the second latching part 44*a* comes into contact with the under surface 32*c* of the upper right retainer 32. The second terminal 44 is thereby secondarily locked by the external housing 2, which prevents the second terminal 44 from being pulled out of the second hole 3*e*.

Typically, the second wire 43, which is a wire for power transmission, has a larger diameter than the first wire 41, which is a wire for signal transmission. Thus, the second terminal 44 is larger than the first terminal 42.

Thus, the position at which the first latching part 42*a* is formed in the first terminal 42 is different from the position at which the second latching part 44*a* is formed in the second terminal 44. To be more specific, the distance from the distal end of the second terminal to the part where the second latching part 44*a* is formed is longer than the distance from the distal end of the first terminal to the part where the first latching part 42*a* is formed.

This allows adjustment so that the second terminal 44 with the second latching part 44*a* comes into contact with the upper right retainer 32 and is thereby secondarily locked when the first terminal 42 with the first latching part 42*a* comes into contact with the left retainer 31 and the lower right retainer 33 and is thereby secondarily locked.

Although the first internal housing 3 is described above as an example, the same applies to the second internal housing 4.

Figure 36:
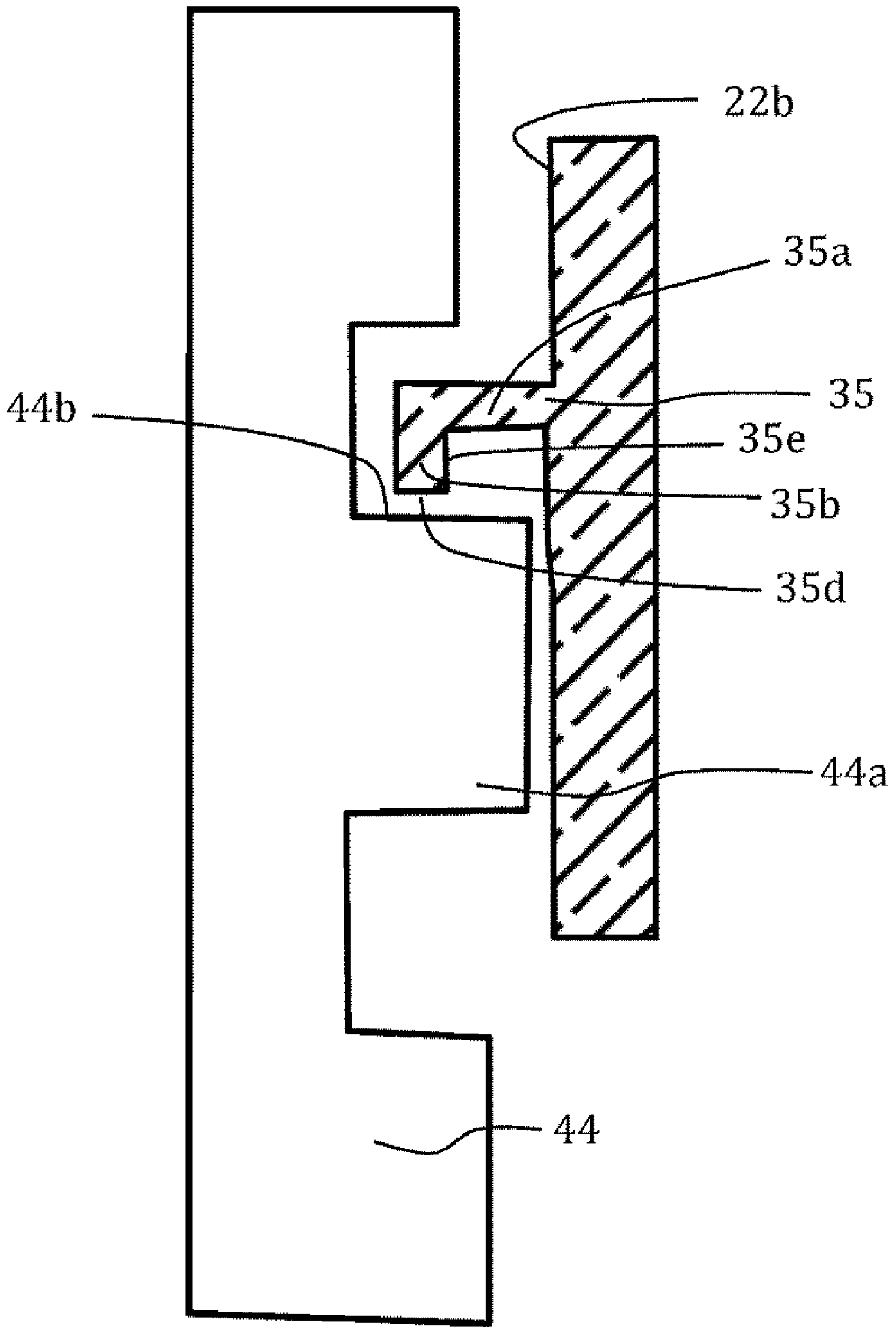
FIG. 36 is a view showing the second terminal inserted into the second internal housing and the retainers of the external housing.

In the second internal housing 4, as shown in FIG. 36, the upper surface 44*b* of the second latching part 44*a* in the second terminal 44 comes into contact with an under surface 35*d* of the vertical part 35*b* in the upper right retainer 35 that extends inward of the second cavity 12.

The second terminal 44 is thereby secondarily locked by the external housing 2, which prevents the second terminal 44 from being pulled out of the second hole 4*e*.

The same applies to the third internal housing 5.

Figure 37:
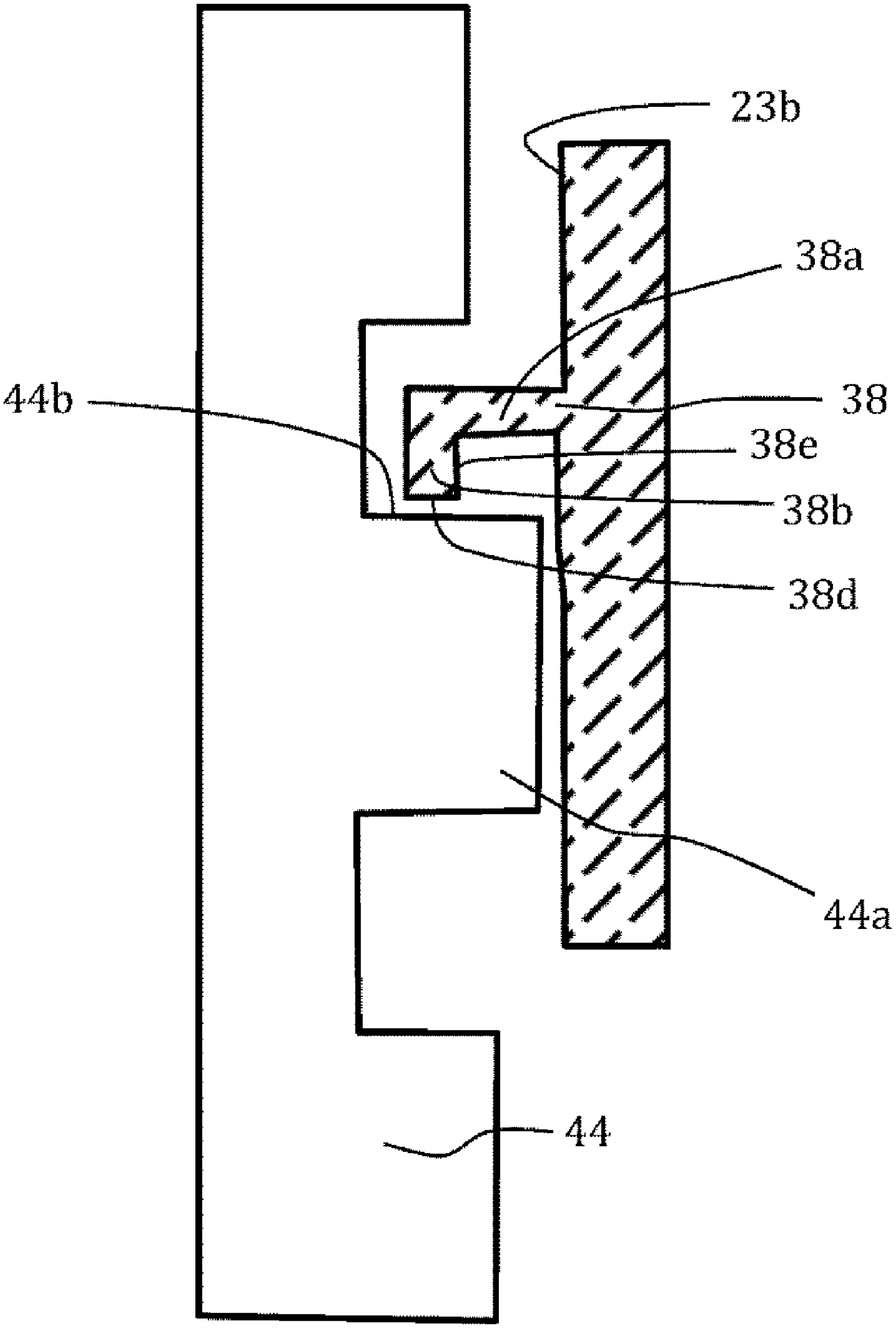
FIG. 37 is a view showing the second terminal inserted into the third internal housing and the retainers of the external housing.

In the third internal housing 5, as shown in FIG. 37, the upper surface 44*b* of the second latching part 44*a* in the second terminal 44 comes into contact with an under surface 38*d* of the vertical part 38*b* in the lower right retainer 39 that extends inward of the third cavity 13.

The second terminal 44 is thereby secondarily locked by the external housing 2, which prevents the second terminal 44 from being pulled out of the second hole 5*e*.

Figure 38:
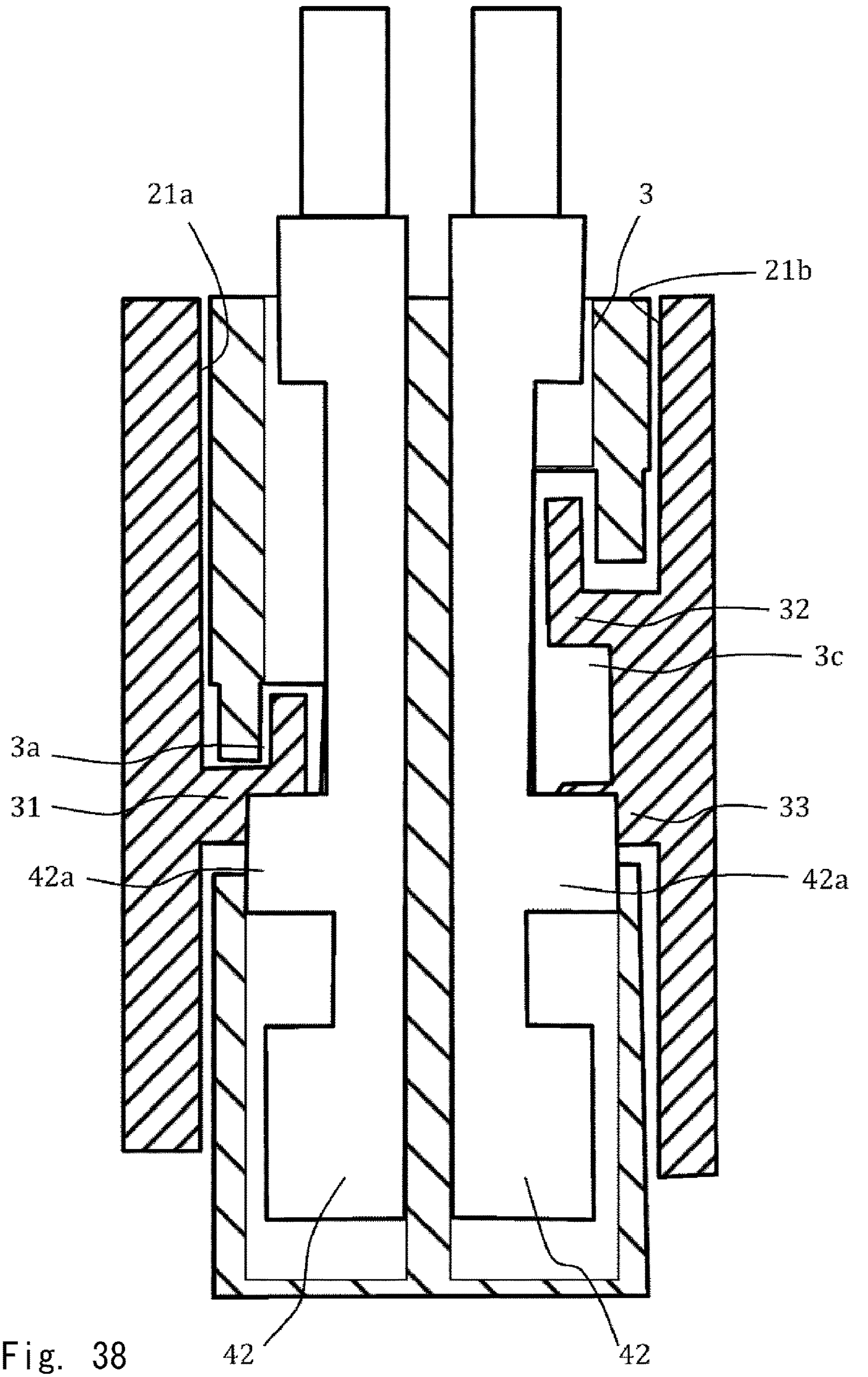
FIG. 38 is a view showing the state where the first terminal is not completely inserted.

FIG. 38 shows an example of the case where each of the first terminals 42 in the left row and the right row is about to be inserted into the external housing 2 in the state where it is not completely inserted into the first internal housing 3. The "state where the first terminal 42 is not completely inserted into the first internal housing 3" indicates the state where the first terminal 42 is inserted into the corresponding hole of the first internal housing 3 but not inserted to the normal position.

In this case, the first latching part 42*a* of the first terminal 42 disposed in the left row projects into the groove part 3*a*. Thus, when the first internal housing 3 is about to be inserted into the external housing 2, the first latching part 42*a* physically interferes with the left retainer 31.

Likewise, the first latching part 42*a* of the first terminal 42 disposed in the right row projects into the groove part 3*c*. Thus, when the first internal housing 3 is about to be inserted into the external housing 2, the first latching part 42*a* physically interferes with the lower right retainer 33.

This allows detecting that the first terminal 42 is not completely inserted.

Incomplete insertion of the first terminal is detectable in the same manner in the second internal housing 4 and the third internal housing 5.

For the second terminal 44 also, incomplete insertion is detectable depending on whether there is physical interference with the upper right retainer 32, 35, or 38.

The retainers 31, 32, and 34 to 39 in the external housing 2 include the vertical parts 31*b*, 32*b*, 34*b* to 39*b* at the distal ends of the horizontal parts 31*a*, 32*a*, 34*a* to 39*a*, respectively, so that they are shaped like a hook when viewed from the front. The effect of having the hook shape is described hereinafter.

Figure 39:
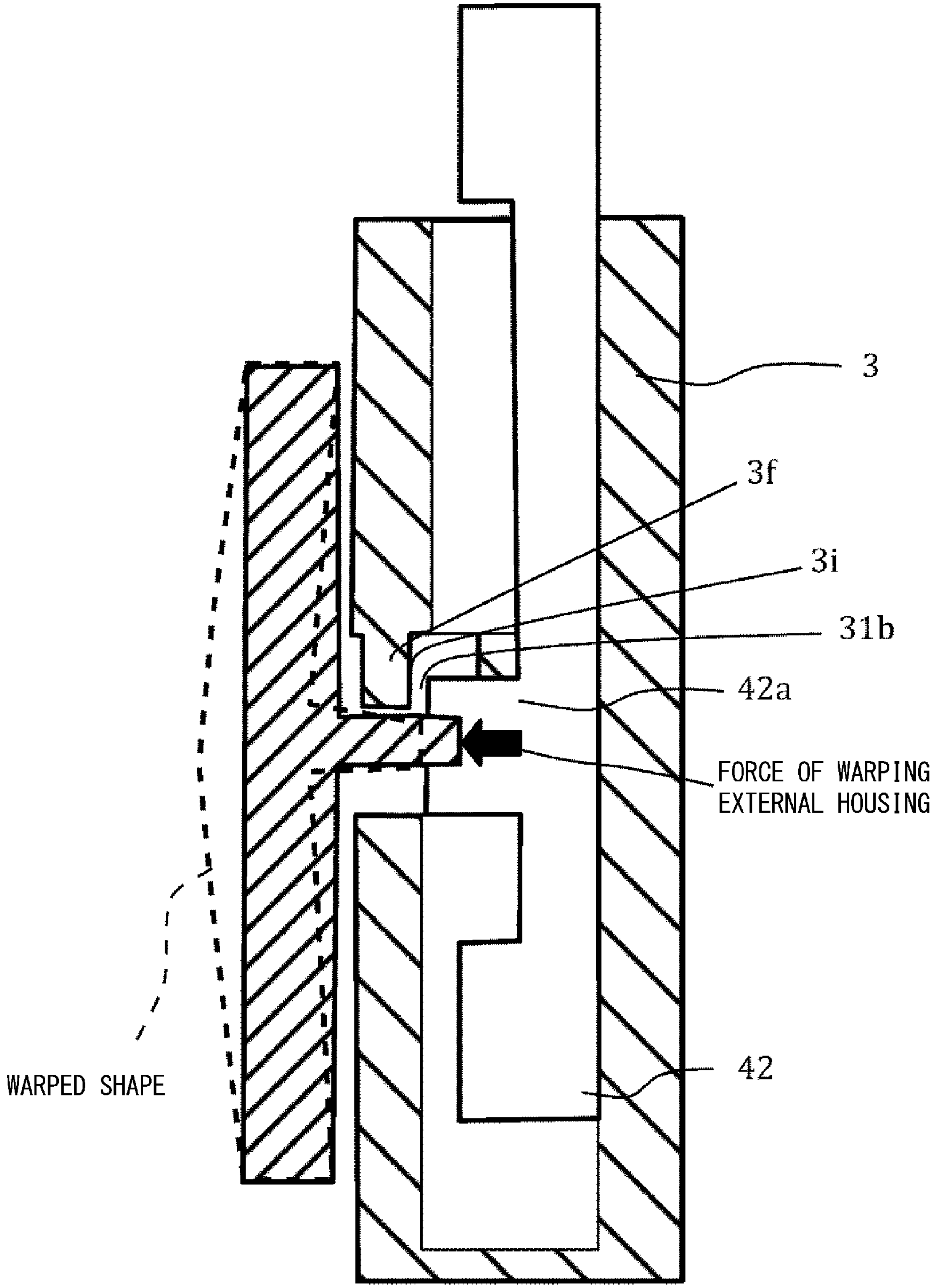
FIG. 39 is a view showing the state where the external housing is warped when a retainer does not have a hook shape.

An example of the case where the retainer does not have a hook shape is described first. FIG. 39 is a view based on the assumption that the left retainer 31 does not have the vertical part 31*b* and thus not have a hook shape.

When the first terminal 42 is not completely inserted into the first internal housing 3, and further the first internal housing 3 is about to be forcibly inserted into the first cavity 11, the left side wall surface 21*a* is warped leftward because the inner wall of the external housing 2 is thin. This can cause the first internal housing 3 to push past the retainer 31 and become inserted into the external housing 2.

Figure 40:
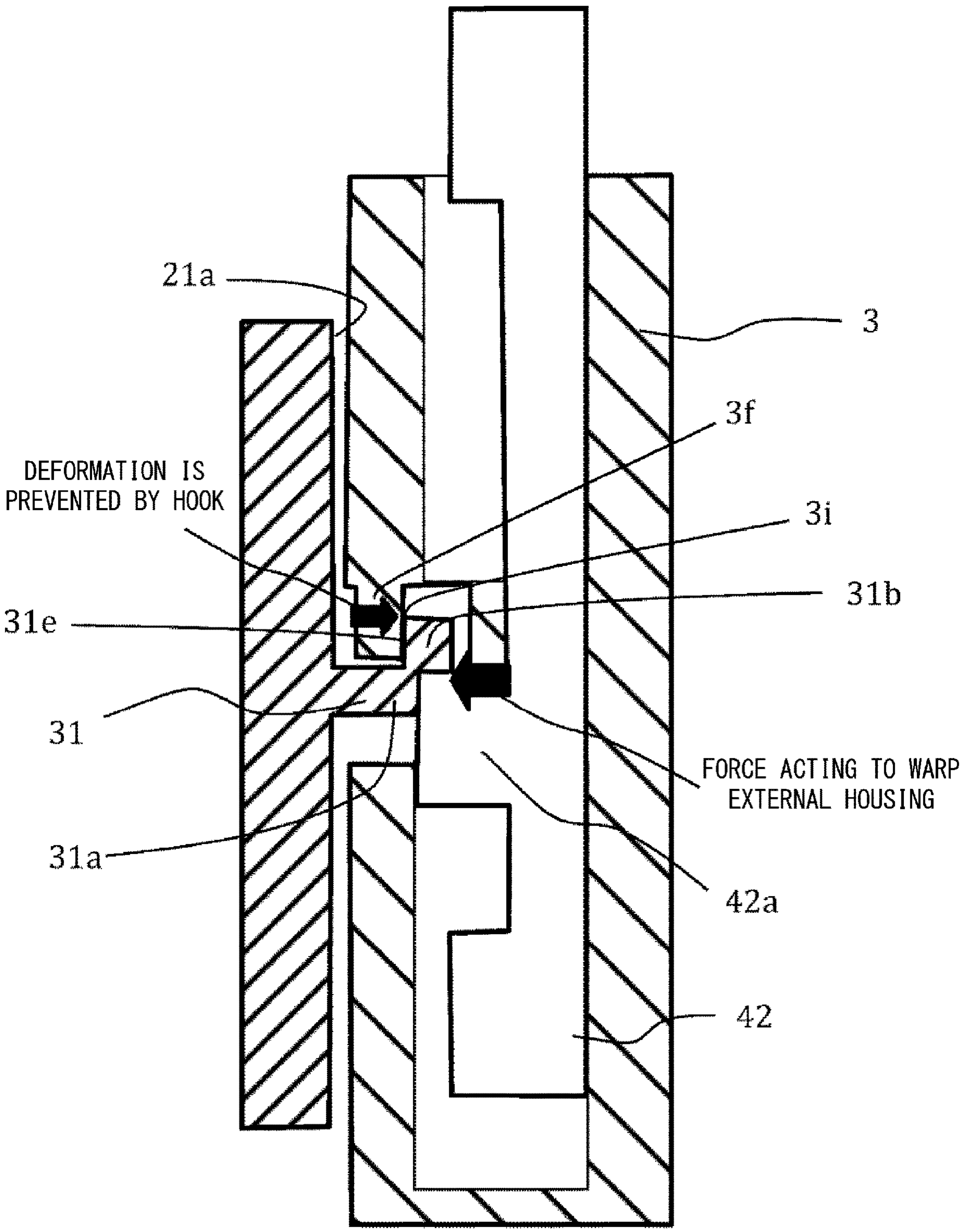
FIG. 40 is a view showing an example of the state where the occurrence of warpage is prevented by a force acting to warp the external housing and a hook shape of a retainer.
Figure 41:
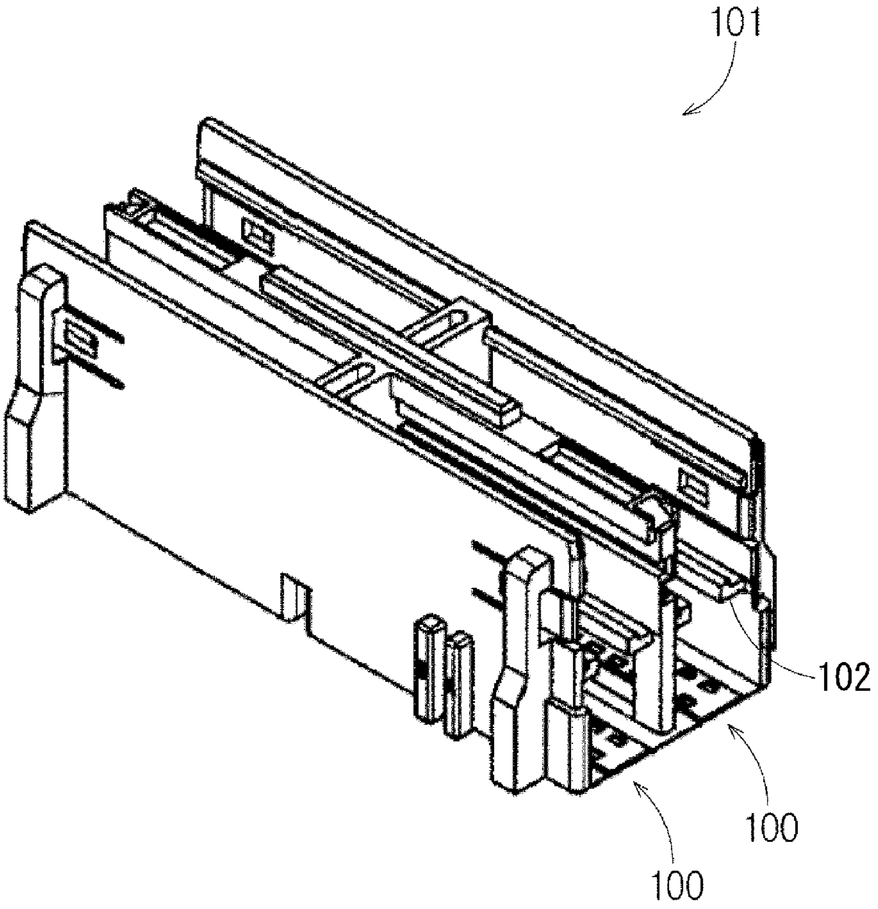
FIG. 41 is view of a simplified version of FIG. 2 in Patent literature 1.

An example of the case where the retainer has a hook shape is described next. As shown in FIG. 40, the left retainer 31 has the vertical part 31*b*, and when a force of warping the external housing 2 is applied, the vertical part 31*b* of the left retainer 31 and the projecting part 3*f* of the first internal housing 3 come into contact with each other. The inner wall surface of the first cavity 11 and the outer wall surface of the first internal housing 3 are thereby restrained by each other, which prevents the occurrence of warp deformation of the external housing 2.

Further, in this case, since warp deformation does not occur in the external housing 2, even when the first internal housing 3 in which the first terminal 42 is not completely inserted is about to be forcibly inserted into the first cavity 11, the first terminal 42 comes into contact with the left retainer 31 in the insertion direction of the first internal housing 3, which stops the insertion of the first internal housing 3. This prevents the first internal housing 3 in which the first terminal 42 is not completely inserted from being inserted into the external housing 2.

Although the case where the left retainer 31 of the first internal housing 3 has a hook shape is described above, the same applies to the other internal housings 4 and 5, and the other retainers in a hook shape. Further, the case where a force of warping the external housing 2 is generated due to incomplete insertion of the first terminal 42 is described above, the same applies to the case where a force of warping the external housing 2 is generated by different reasons.

As described above, even when the external housing 2 is thin and a force of deforming the external housing 2 is applied, the vertical parts 31*b*, 32*b*, 34*b* to 39*b* act as a hook, which prevents the deformation of the external housing 2. Further, this prevents the internal housings 3 to 5 into which the terminal 42 or 44 is not completely inserted from being inserted into the external housing 2.

In this structure, when inserting a plurality of internal housings into a plurality of cavities, a restriction is placed so that each internal housing is not inserted into a cavity different from the corresponding cavity. Further, since a new structure is not added to place this restriction, this contributes to size reduction of a connector.

Further, in this structure, the function of restraining the inner wall surface of the cavity and the outer wall surface of the internal housing with each other is achieved with a retainer of a simple shape.

Further, even if a plurality of wires using a different types of terminals are inserted into one internal housing when the internal housings 3, 4 and 5 are accommodated in the external housing 2, the retainer projecting from the inner wall surface that forms the cavity of the external housing 2 and the latching part of each terminal come into contact with each other, so that secondary locking of each terminal is achieved.

Further, in the connector 1, when any of the terminals 42 and 44 inserted into the internal housing 3, 4 or 5 is not completely inserted, the latching part of the terminal physically interferes with the retainer when inserting the internal housing into the external housing 2, so that the incomplete insertion state of the terminal is detected.

Furthermore, when any of the terminals inserted into each internal housing is not sufficiently inserted, the retainer physically interferes with this terminal in the housing insertion direction without secondarily locking the terminal. As a result, the retainer runs on this terminal, and the inner wall surface of the cavity in which the retainer is formed is deformed in a direction away from the outer wall surface of the internal housing, which can break the external housing. In the above-described structure, since the retainer has a bent shape and the corresponding groove part has a shape that is complementary to the shape of the retainer, the inner wall surface of the cavity and the outer wall surface of the internal housing are restrained by each other, which prevents the breakage of the external housing.

The above-described embodiment has the following first and second features.

(First Feature)

The inner wall surface of each of the cavities includes a first inner wall surface and a second inner wall surface opposed to each other. The first inner wall surfaces of the plurality of cavities face in the same direction. The plurality of cavities include a first cavity and a second cavity. The retainer of the first cavity has an L shape that projects from the first inner wall surface toward the second inner wall surface and further projects upward. The retainer of the second cavity has an L shape that projects from the first inner wall surface toward the second inner wall surface and further projects downward. In this structure, the retainers having different shapes from one another are achieved in a simple structure. The above feature is obviously shown particularly in FIGS. 9 and 10 in the above-described embodiment.

Specifically, as shown in FIG. 9, the inner wall surface of each cavity (12, 13) includes the first inner wall surface and the second inner wall surface that are opposed to each other. To be specific, the inner wall surface of the cavity 12 includes the left side wall surface 22*a* (first inner wall surface) and the right side wall surface 22*b* (second inner wall surface) that are opposed to each other. As shown in FIG. 10, the inner wall surface of the cavity 13 includes the left side wall surface 23*a* (first inner wall surface) and the right side wall surface 23*b* (second inner wall surface) that are opposed to each other.

As shown in FIGS. 9 and 10, the inner wall surfaces of the plurality of cavities (12 and 13) face in the same direction. To be specific, both of the left side wall surface 22*a* (first inner wall surface) of the cavity 12 shown in FIG. 9 and the left side wall surface 23*a* (first inner wall surface) of the cavity 13 shown in FIG. 10 face in the same direction (rightward).

The plurality of cavities (12 and 13) include the first cavity and the second cavity. To be specific, the plurality of cavities (12 and 13) include the cavity 12 (first cavity) and the cavity 13 (second cavity).

The retainer of the first cavity has an L shape that projects from the first inner wall surface toward the second inner wall surface and further projects upward. To be specific, as shown in FIG. 9, the left retainer 34 (retainer) of the cavity 12 has an L shape that projects from the left side wall surface 22*a* (first inner wall surface) toward the right side wall surface 22*b* (second inner wall surface) and further projects upward.

The retainer of the second cavity has an L shape that projects from the first inner wall surface toward the second inner wall surface and further projects downward. To be specific, as shown in FIG. 10, the left retainer 37 (retainer) of the cavity 13 has an L shape that projects from the left side wall surface 23*a* (first inner wall surface) toward the right side wall surface 23*b* (second inner wall surface) and further projects downward.

(Second Feature)

The inner wall surface of each of the cavities includes a first inner wall surface and a second inner wall surface opposed to each other. The first inner wall surfaces of the plurality of cavities face in the same direction. In each of the cavities, a first retainer disposed on the first inner wall surface and a second retainer disposed on the second inner wall surface are formed as the retainer. A shape pattern of each of the cavities is any one of following four shape patterns. There is no duplication of the shape patterns among the plurality of cavities.

A first shape pattern where the first retainer has an L shape that projects from the first inner wall surface toward the second inner wall surface and further projects upward, and the second retainer has an L shape that projects from the second inner wall surface toward the first inner wall surface and further projects upward A second shape pattern where the first retainer has an L shape that projects from the first inner wall surface toward the second inner wall surface and further projects upward, and the second retainer has an L shape that projects from the second inner wall surface toward the first inner wall surface and further projects downward A third shape pattern where the first retainer has an L shape that projects from the first inner wall surface toward the second inner wall surface and further projects downward, and the second retainer has an L shape that projects from the second inner wall surface toward the first inner wall surface and further projects upward A fourth shape pattern where the first retainer has an L shape that projects from the first inner wall surface toward the second inner wall surface and further projects downward, and the second retainer has an L shape that projects from the second inner wall surface toward the first inner wall surface and further projects downward As described above, since there are four possible shape patterns that are different from one another, even when the connector 1 includes four cavities at the maximum, this structure prevents each internal housing from being inserted into a cavity different from a corresponding cavity when inserting a plurality of internal housings into a plurality of cavities formed in an external housing. The above feature is obviously shown particularly in FIGS. 9 and 10 in the above-described embodiment.

Specifically, as shown in FIG. 9, the inner wall surface of each cavity (12, 13) includes the first inner wall surface and the second inner wall surface that are opposed to each other. To be specific, the inner wall surface of the cavity 12 includes the left side wall surface 22*a* (first inner wall surface) and the right side wall surface 22*b* (second inner wall surface) that are opposed to each other. As shown in FIG. 10, the inner wall surface of the cavity 13 includes the left side wall surface 23*a* (first inner wall surface) and the right side wall surface 23*b* (second inner wall surface) that are opposed to each other.

As shown in FIGS. 9 and 10, the inner wall surfaces of the plurality of cavities (12 and 13) face in the same direction. To be specific, both of the left side wall surface 22*a* (first inner wall surface) of the cavity 12 shown in FIG. 9 and the left side wall surface 23*a* (first inner wall surface) of the cavity 13 shown in FIG. 10 face in the same direction (rightward).

In each of the cavities, the first retainer disposed on the first inner wall surface and the second retainer disposed on the second inner wall surface are formed as the retainer. To be specific, as shown in FIG. 9, in the cavity 12, the left retainer 34 (first retainer) disposed on the left side wall surface 22*a* (first inner wall surface) and the lower right retainer 36 (second retainer) disposed on the right side wall surface 22*b* (second inner wall surface) are formed as the retainer. Likewise, as shown in FIG. 10, in the cavity 13, the left retainer 37 (first retainer) disposed on the left side wall surface 23*a* (first inner wall surface) and the lower right retainer 39 (second retainer) disposed on the right side wall surface 23*b* (second inner wall surface) are formed as the retainer.

A shape pattern of each of the cavities is any one of following four shape patterns. There is no duplication of the shape patterns among the plurality of cavities (12 and 13).

The four shape patterns include a first shape pattern to a fourth shape pattern.

The first shape pattern is a pattern where the first retainer (left-side retainer) has a shape of L bending upward, and the second retainer (right-side retainer) has a shape of L bending upward.

The second shape pattern is a pattern where the first retainer (left-side retainer) has a shape of L bending upward, and the second retainer (right-side retainer) has a shape of L bending downward. The shape pattern of the cavity 12 shown in FIG. 9 corresponds to the second shape pattern.

The third shape pattern is a pattern where the first retainer (left-side retainer) has a shape of L bending downward, and the second retainer (right-side retainer) has a shape of L bending upward.

The fourth shape pattern is a pattern where the first retainer (left-side retainer) has a shape of L bending downward, and the second retainer (right-side retainer) has a shape of L bending downward. The shape pattern of the cavity 13 shown in FIG. 10 corresponds to the fourth shape pattern.

The first retainer (left-side retainer) having a shape of L bending upward has an L shape that projects from the first inner wall surface toward the second inner wall surface and further projects upward. To be specific, as shown in FIG. 9, the left retainer 34 (first retainer) disposed on the left side wall surface 22*a* (first inner wall surface) has an L shape that includes the horizontal part 34*a* that projects from the left side wall surface 22*a* (first inner wall surface) toward the right side wall surface 22*b* (second inner wall surface) and the vertical part 34*b* that projects upward from the horizontal part 34*a*.

The first retainer (left-side retainer) having a shape of L bending downward means the first retainer having an L shape that projects from the first inner wall surface toward the second inner wall surface and further projects downward. To be specific, as shown in FIG. 10, the left retainer 37 (first retainer) disposed on the left side wall surface 23*a* (first inner wall surface) has an L shape that includes the horizontal part 37*a* that projects from the left side wall surface 23*a* (first inner wall surface) toward the right side wall surface 23*b* (second inner wall surface) and the vertical part 37*b* that projects downward from the horizontal part 37*a*.

The second retainer (right-side retainer) having a shape of L bending upward means the second retainer having an L shape that projects from the second inner wall surface toward the first inner wall surface and further projects upward.

The second retainer (right-side retainer) having a shape of L bending downward means the second retainer having an L shape that projects from the second inner wall surface toward the first inner wall surface and further projects downward. To be specific, as shown in FIG. 10, the lower right retainer 39 (second retainer) disposed on the right side wall surface 23*b* (second inner wall surface) has an L shape that includes the horizontal part 39*a* that projects from the right side wall surface 23*b* (second inner wall surface) toward the left side wall surface 23*a* (first inner wall surface) and the vertical part 39*b* that projects downward from the horizontal part 39*a*.

Note that the present disclosure is not limited to the above-described embodiments and can be modified as appropriate without departing from the spirit and scope of the present disclosure.

As shown in FIG. 1, the case where the three internal housings 3, 4, and 5 are accommodated in the external housing 2 is described above. However, the present disclosure is not limited to thereto, and four or more internal housings may be accommodated. Further, in the external housing 2, a pattern of combination of projecting parts (shape patterns) increases by increasing the number of projecting parts formed in a plurality of cavities.

In this specification, "complementary shape" does not mean that no gap is left between an internal housing and an inner wall surface of a cavity when the internal housing is inserted into the cavity. A certain gap is left between the internal housing and the inner wall surface of the cavity when the internal housing is inserted into the cavity so that the internal housing is easily inserted into the cavity. This gap also functions to absorb dimensional manufacturing errors in the internal housing and the external housing.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connector comprising:

an external housing including a plurality of cavities; and a plurality of internal housings to be respectively inserted into the plurality of cavities, each internal housing accommodating a plurality of terminals, wherein a retainer extending in a housing insertion direction of inserting each of the internal housings into each of the cavities is formed on an inner wall surface of each of the cavities, a groove part for receiving the retainer when each of the internal housings is inserted into each of the cavities is formed on an outer wall surface of each of the internal housings, wherein the retainer of each cavity of the external housing and the groove part of each internal housing are configured such that, when each of the internal housings is inserted into each of the cavities, the retainer is inserted into the groove part, and thereby the plurality of terminals accommodated in each of the internal housings are secondarily locked by the retainer, wherein the secondarily locking is such that when a force is applied to pull out a terminal accommodated in an internal housing, a surface of the terminal comes into contact with a surface of the retainer to prevent the terminal from being pulled out of the internal housing, the retainers of the plurality of cavities have different shapes from one another, and the groove parts of the plurality of internal housings have shapes complementary to the shapes of the retainers of corresponding cavities.

2. The connector according to claim 1, wherein cross sections orthogonal to the housing insertion direction of the retainers of the plurality of cavities have different shapes from one another.

3. The connector according to claim 2, wherein the retainer of each of the cavities includes a retainer first projecting part projecting from the inner wall surface of each of the cavities when viewed in the housing insertion direction and a retainer second projecting part projecting from the retainer first projecting part in a direction different from a projecting direction of the retainer first projecting part.

4. The connector according to claim 3, wherein the retainer first projecting part projects in a direction orthogonal to the inner wall surface, and the retainer second projecting part projects in a direction parallel to the inner wall surface.

5. The connector according to claim 1, wherein the inner wall surface of each of the cavities includes a first inner wall surface and a second inner wall surface opposed to each other, the first inner wall surfaces of the plurality of cavities face in the same direction, the plurality of cavities include a first cavity and a second cavity, the retainer of the first cavity has an L shape that projects from the first inner wall surface toward the second inner wall surface and further projects upward, and the retainer of the second cavity has an L shape that projects from the first inner wall surface toward the second inner wall surface and further projects downward.

6. The connector according to claim 1, wherein the inner wall surface of each of the cavities includes a first inner wall surface and a second inner wall surface opposed to each other, the first inner wall surfaces of the plurality of cavities face in the same direction, in each of the cavities, a first retainer disposed on the first inner wall surface and a second retainer disposed on the second inner wall surface are formed as the retainer, a shape pattern of each of the cavities is any one of following four shape patterns, and there is no duplication of the shape patterns among the plurality of cavities a first shape pattern where the first retainer has an L shape that projects from the first inner wall surface toward the second inner wall surface and further projects upward, and the second retainer has an L shape that projects from the second inner wall surface toward the first inner wall surface and further projects upward a second shape pattern where the first retainer has an L shape that projects from the first inner wall surface toward the second inner wall surface and further projects upward, and the second retainer has an L shape that projects from the second inner wall surface toward the first inner wall surface and further projects downward a third shape pattern where the first retainer has an L shape that projects from the first inner wall surface toward the second inner wall surface and further projects downward, and the second retainer has an L shape that projects from the second inner wall surface toward the first inner wall surface and further projects upward a fourth shape pattern where the first retainer has an L shape that projects from the first inner wall surface toward the second inner wall surface and further projects downward, and the second retainer has an L shape that projects from the second inner wall surface toward the first inner wall surface and further projects downward.

* * * * *